(12) United States Patent
Taniguchi et al.

(10) Patent No.: US 12,537,471 B2
(45) Date of Patent: Jan. 27, 2026

(54) POWER CONVERTER, MOTOR DRIVE SYSTEM, AND POWER CONVERSION METHOD

(71) Applicant: Mitsubishi Electric Corporation, Tokyo (JP)

(72) Inventors: Tomoyuki Taniguchi, Tokyo (JP); Kazushige Sawada, Tokyo (JP); Keisuke Uemura, Tokyo (JP); Kazuhiro Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 177 days.

(21) Appl. No.: 18/688,148

(22) PCT Filed: Nov. 30, 2021

(86) PCT No.: PCT/JP2021/043964
§ 371 (c)(1),
(2) Date: Feb. 29, 2024

(87) PCT Pub. No.: WO2023/100267
PCT Pub. Date: Jun. 8, 2023

(65) Prior Publication Data
US 2024/0380352 A1    Nov. 14, 2024

(51) Int. Cl.
*H02P 27/08*    (2006.01)
*H02P 21/05*    (2006.01)

(52) U.S. Cl.
CPC ............ *H02P 27/085* (2013.01); *H02P 21/05* (2013.01)

(58) Field of Classification Search
CPC ......... H02P 27/085; H02P 21/05; H02P 27/06
(Continued)

(56) References Cited

U.S. PATENT DOCUMENTS 9,628,004 B2 * 4/2017 Sakai ................. H02P 6/14
11,323,025 B2   5/2022 Takahara et al.

FOREIGN PATENT DOCUMENTS

| JP | 2012-060855 A | 3/2012 |
| JP | 2014-131446 A | 7/2014 |
| WO | 2019/230430 A1 | 12/2019 |

OTHER PUBLICATIONS

International Search Report of the International Searching Authority mailed Jan. 25, 2022 for the corresponding International Application No. PCT/JP2021/043964 (and English translation).

* cited by examiner

*Primary Examiner* — David Luo
(74) *Attorney, Agent, or Firm* — Posz Law Group, PLC

(57) ABSTRACT

A power converter includes: a first converter circuit; an inverter circuit; a first smoothing unit connected between the first converter circuit and the inverter circuit, the first smoothing unit including a first smoothing capacitor having a breakdown voltage equal to a second voltage threshold and a second smoothing capacitor having a breakdown voltage higher than a first voltage threshold, the first voltage threshold being higher than or equal to a second voltage threshold; an interrupting device connected in series to the first smoothing capacitor; a voltage detector that detects a voltage across the second smoothing capacitor; and a controller that, in a case where the detected voltage is higher than or equal to the second voltage threshold, opens the interrupting device and controls a rotation speed of a motor such that a ripple current through the second smoothing capacitor is less than or equal to a rated ripple current.

20 Claims, 13 Drawing Sheets

(58) Field of Classification Search
USPC .................................................. 318/503, 494
See application file for complete search history.

POWER CONVERTER, MOTOR DRIVE SYSTEM, AND POWER CONVERSION METHOD

CROSS-REFERENCE TO RELATED APPLICATION

This application is a U.S. national stage application of PCT/JP2021/043964 filed on Nov. 30, 2021, the contents of which are incorporated herein by reference.

FIELD

The present disclosure relates to a power converter that converts input power into desired output power, a motor drive system, and a power conversion method.

BACKGROUND

As one of power converters that convert input power into desired output power, there is a power converter having a configuration in which a smoothing capacitor is connected to a converter circuit such as a diode rectifier circuit. For this power converter, studies have been made for protecting the smoothing capacitor from a high voltage when an alternating current input voltage to the converter circuit is high.

For example, in a power converter described in Patent Literature 1, a smoothing capacitor (first capacitor) having high breakdown voltage and low capacitance and a smoothing capacitor (second capacitor) having low breakdown voltage and high capacitance are connected in parallel. In the power converter described in Patent Literature 1, when a potential difference across the first capacitor is higher than or equal to a reference value, a switch connected in series with the second capacitor is turned off so that the second capacitor is protected.

PATENT LITERATURE

Patent Literature 1: Japanese Patent Application Laid-open No. 2012-60855

However, in the technique of Patent Literature 1 above, when the potential difference across the first capacitor is higher than or equal to the reference value, the operation is continued only with the first capacitor having low capacitance. At this time, in a case where the power converter has a configuration in which an inverter circuit and a motor are connected in addition to the converter circuit and the smoothing capacitor, the decrease in the capacitance of the smoothing capacitor results in pulsation of various voltages and various currents. As a result, in the power converter of Patent Literature 1, the ripple current in the smoothing capacitor increases to exceed the rated ripple current in some cases. When the ripple current exceeding the rated ripple current flows through the smoothing capacitor for a long time, there is a problem that the life of the smoothing capacitor is significantly reduced.

SUMMARY

The present disclosure has been made in view of the above, and an object thereof is to provide a power converter that can prevent a reduction in life of a smoothing capacitor connected to a converter circuit.

In order to solve the above problem and achieve the object, a power converter of the present disclosure comprises: a first converter circuit to convert an alternating current voltage from an alternating current power supply into a direct current voltage; an inverter circuit to convert the direct current voltage obtained by conversion by the first converter circuit into an alternating current voltage, and supply the alternating current voltage to a motor; a first smoothing unit connected between the first converter circuit and the inverter circuit, the first smoothing unit including a first smoothing capacitor and a second smoothing capacitor, the first smoothing capacitor having a first breakdown voltage equal to a second voltage threshold, the second smoothing capacitor having a second breakdown voltage higher than a first voltage threshold, the first voltage threshold being a value higher than or equal to the second voltage threshold, the first smoothing capacitor and the second smoothing capacitor being connected in parallel; a first interrupting device connected in series to the first smoothing capacitor; and a first voltage detector to detect an applied voltage across the second smoothing capacitor. The power converter of the present disclosure further comprises a controller to, in a case where a first detected value as a detected value of the applied voltage detected by the first voltage detector is higher than or equal to the second voltage threshold, open the first interrupting device and control a rotation speed of the motor such that a ripple current flowing through the second smoothing capacitor is less than or equal to a rated ripple current.

The power converter according to the present disclosure has an effect of preventing a reduction in life of the smoothing capacitor connected to the converter circuit.

DETAILED DESCRIPTION

Hereinafter, a power converter, a motor drive system, and a power conversion method according to embodiments of the present disclosure will be described in detail with reference to the drawings. The magnitude relationship among breakdown voltages and voltage thresholds described in first to fourth embodiments below is: "a breakdown voltage of a first smoothing capacitor (first breakdown voltage)"="a second voltage threshold"≤"a first voltage threshold"<"a third voltage threshold"="a breakdown voltage of a second smoothing capacitor (second breakdown voltage)"≤"a breakdown voltage of a third smoothing capacitor". These breakdown voltages and voltage thresholds will be described later.

First Embodiment

Figure 1:
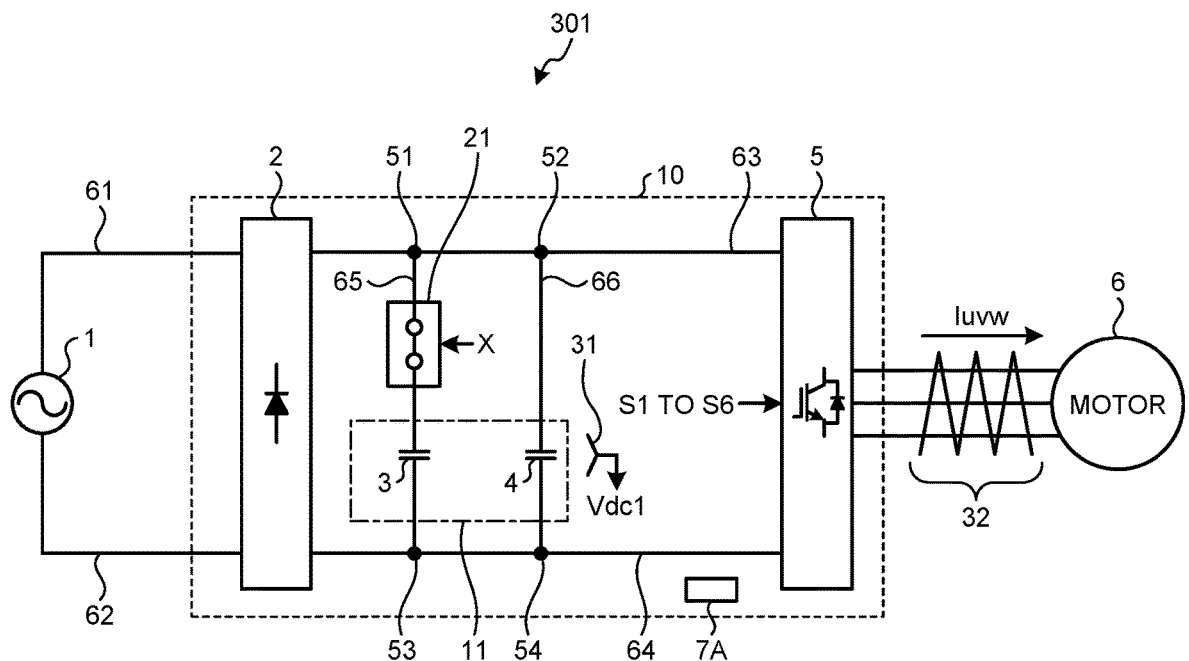
FIG. 1 is a diagram illustrating a configuration of a motor drive system including a power converter according to a first embodiment.

FIG. 1 is a diagram illustrating a configuration of a motor drive system including a power converter according to a first embodiment. A motor drive system 301 is connected to an alternating current power supply 1. The motor drive system 301 includes a power converter 10, a motor 6, and a current detector 32.

The motor drive system 301 is a system that converts input power into desired output power by the power converter 10 and supplies the converted power to the motor 6. In the motor drive system 301, the alternating current power supply 1 inputs alternating current power to the power converter 10, and the motor 6 is driven by three-phase power generated by the power converter 10.

The power converter 10 is a motor controller that controls the motor 6 by supplying the power to the motor 6. The power converter 10 includes a first converter circuit 2, a first smoothing unit 11, an inverter circuit 5, and a first interrupting device 21. The first smoothing unit 11 includes a first smoothing capacitor 3 and a second smoothing capacitor 4.

The power converter 10 also includes a first voltage detector 31 and a controller 7A. The controller 7A controls, on the basis of detection signals from the first voltage detector 31 and the current detector 32, opening and closing of the first interrupting device 21 and switching on and off of each switching element of the inverter circuit 5.

The alternating current power supply 1 is a commercial alternating current system, a private power generator, or the like. The motor 6 is a permanent magnet motor including a three-phase, Y-connected stator in which three-phase windings including a U-phase winding, a V-phase winding, and a W-phase winding are connected in a Y shape, and a permanent magnet rotor. Note that the alternating current power supply 1 and the motor 6 are not limited to the above configuration, and, for example, the stator in the motor 6 may be a three-phase, Δ-connected stator in which the three-phase windings are connected in a Δ shape.

The first converter circuit 2 converts an alternating current voltage from the alternating current power supply 1 into a direct current voltage. The first converter circuit 2 is a diode rectifier circuit in which four diode elements are bridge-connected. Note that the type of the diode element used in the first converter circuit 2 is not limited to a fast recovery diode (FRD) or soft recovery diode (SRD). The diode element used in the first converter circuit 2 may be an element using material such as silicon carbide (SiC), gallium nitride (GaN), or gallium oxide (Ga2O3). Also, the first converter circuit 2 may be a circuit that uses switching elements to form a step-up circuit, a step-down circuit, a step-up/down circuit, or the like.

The alternating current power supply 1 and the first converter circuit 2 are connected via connection lines 61 and 62. The first converter circuit 2 and the inverter circuit 5 are connected via connection lines 63 and 64.

A connection point 51 disposed on the connection line 63 and a connection point 53 disposed on the connection line 64 are connected via a connection line 65. A connection point 52 disposed on the connection line 63 and a connection point 54 disposed on the connection line 64 are connected via a connection line 66. The connection point 52 is a connection point on a side of a subsequent stage of the connection point 51, and the connection point 54 is a connection point on a side of a subsequent stage of the connection point 53.

The first interrupting device 21 and the first smoothing capacitor 3 are connected in series on the connection line 65. That is, the connection point 51 is connected to the connection point 53 via the first interrupting device 21 and the first smoothing capacitor 3. When the first interrupting device 21 is closed, the first smoothing capacitor 3 and the connection point 51 are connected, and when the first interrupting device 21 is opened, the first smoothing capacitor 3 and the connection point 51 are disconnected. The second smoothing capacitor 4 is disposed on the connection line 66. That is, the connection point 52 is connected to the connection point 54 via the second smoothing capacitor 4.

Accordingly, in the first smoothing unit 11 of the power converter 10, the first smoothing capacitor 3 and the second smoothing capacitor 4 are connected in parallel to each other. When the first voltage threshold is a value higher than or equal to the second voltage threshold ("first voltage threshold"≥"second voltage threshold"), the first breakdown voltage that is the breakdown voltage of the first smoothing capacitor (low breakdown voltage capacitor) 3 has the same value as the second voltage threshold.

Moreover, the second breakdown voltage that is the breakdown voltage of the second smoothing capacitor 4 is higher than the first voltage threshold. The first smoothing capacitor 3 and the second smoothing capacitor 4 smooth the direct current voltage, which is obtained by conversion by the first converter circuit 2, by converting the direct current voltage into a stable direct current voltage having a constant magnitude.

Note that the first smoothing capacitor 3 and the second smoothing capacitor 4 have capacitances that: allow the ripple current less than or equal to the rated ripple current to flow through each smoothing capacitor under all predetermined rotation speed conditions with the first interrupting device 21 closed; and allow the ripple current less than or equal to the rated ripple current to flow through the second smoothing capacitor 4 under at least one of the rotation speed conditions with the first interrupting device 21 open.

Furthermore, the first smoothing capacitor 3 and the second smoothing capacitor 4 each have breakdown voltage and capacitance such that all the predetermined rotation speed conditions are satisfied when the first interrupting device 21 is closed, and at least one of the rotation speed conditions is satisfied when the first interrupting device 21 is open. The first smoothing capacitor 3 and the second smoothing capacitor 4 each have the breakdown voltage and the capacitance such that a ripple amount (ripple voltage) of an applied voltage across each smoothing capacitor is less than or equal to a value (multiplied value) obtained by multiplying the breakdown voltage of each smoothing capacitor by a percentage (for example, 20 to 40%) determined by chemical properties of the smoothing capacitor. That is, the smoothing capacitors each having the breakdown voltage and capacitance such that the ripple amount of the applied voltage is less than or equal to the multiplied value are used, whereby the operation is performed under all the predetermined rotation speed conditions when the first interrupting device 21 is closed, and the operation is performed under at least one of the rotation speed conditions when the first interrupting device 21 is open.

With the first smoothing capacitor 3 and the second smoothing capacitor 4 each having the capacitance described above, the power converter 10 can realize optimum operation with the capacitor capacitance that is needed.

The first smoothing unit 11 is not limited to the above configuration, and may have any configuration as long as the voltage can be properly smoothed. For example, the first smoothing unit 11 may have a configuration in which three or more smoothing capacitors including the first smoothing capacitor 3 and the second smoothing capacitor 4 are connected in parallel, and an interrupting device is connected in series to all the smoothing capacitors each having a breakdown voltage lower than or equal to the second voltage threshold. With this configuration, the power converter 10 can realize optimum operation with the capacitor capacitance that is needed. Also, the first smoothing unit 11 may be configured such that at least one of the first smoothing capacitor 3 and the second smoothing capacitor 4 includes a plurality of smoothing capacitors connected in series. In a case where the first smoothing unit 11 includes three or more smoothing capacitors connected in parallel as well, each of the smoothing capacitors has the breakdown voltage and capacitance described above.

For the first interrupting device 21, a mechanical relay is used, but a switching element formed of a semiconductor including a wide band gap semiconductor may be used. That is, for the first interrupting device 21, a switching element such as an insulated gate bipolar transistor (IGBT), a metal oxide semiconductor field effect transistor (MOSFET), a SiC-MOSFET, a GaN-FET, a GaN-high electron mobility transistor (HEMT), or a Ga2O3-MOSFET may be used.

The inverter circuit 5 converts the direct current voltage, which is obtained by conversion by the first converter circuit 2 and smoothed by the first smoothing capacitor 3 and the second smoothing capacitor 4, into the alternating current voltage and supplies the alternating current voltage to the motor 6.

In the inverter circuit 5, three switching element pairs (hereinafter referred to as arms) each including two switching elements connected in series are connected in parallel, and a midpoint of each arm is connected to the corresponding winding of the motor 6. The power converter 10 can drive the motor 6 at a desired number of revolutions (rotation speed) by controlling the alternating current voltage, that is, alternating current power output from the inverter circuit 5. The switching element included in the inverter circuit 5 and formed of a semiconductor including a wide band gap semiconductor is not limited to an IGBT or a MOSFET, and may be a SiC-MOSFET, a GaN-FET, a GaN-HEMT, or a Ga2O3-MOSFET.

The first voltage detector 31 detects the applied voltage across the second smoothing capacitor 4 and outputs the detected value as a detected value Vdc1 to the controller 7A. The applied voltage across the second smoothing capacitor 4 and the applied voltage across the first smoothing capacitor 3 are the same. Therefore, the first voltage detector 31 may detect the applied voltage across the first smoothing capacitor 3. The detected value Vdc1 detected by the first voltage detector 31 is a first detected value.

The current detector 32 is disposed on a connection line connecting the inverter circuit 5 and the motor 6, detects a phase current flowing from the inverter circuit 5 to the motor 6, and outputs a detected value as a detected value Iuvw to the controller 7A. The current detector 32 may be a current detector using a current transformer (CT), or may be a current detector using a shunt resistor.

Figure 2:
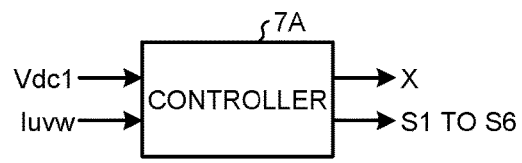
FIG. 2 is a diagram illustrating a configuration of a controller included in the power converter according to the first embodiment.

FIG. 2 is a diagram illustrating a configuration of the controller included in the power converter according to the first embodiment. The controller 7A included in the power converter 10 of the first embodiment receives the detected value Vdc1 transmitted from the first voltage detector 31. The controller 7A also receives the detected value Iuvw transmitted from the current detector 32.

In addition, on the basis of the detected value Vdc1 from the first voltage detector 31, the controller 7A transmits a switching signal X to the first interrupting device 21. The switching signal X is a signal for switching an open/closed state of the first interrupting device 21.

Moreover, on the basis of the detected value Vdc1 from the first voltage detector 31 and the detected value Iuvw from the current detector 32, the controller 7A transmits drive signals S1 to S6 to the switching elements of the inverter circuit 5. The drive signals S1 to S6 are signals for controlling switching on and off of the switching elements of the inverter circuit 5. The controller 7A can thus control opening and closing of the first interrupting device 21 and switching on and off of the switching elements of the inverter circuit 5.

Note that, in a case where the first converter circuit 2 includes switching elements, the controller 7A transmits the drive signals S1 to S6 for controlling switching on and off of the switching elements of the first converter circuit 2 to the first converter circuit 2.

Figure 3:
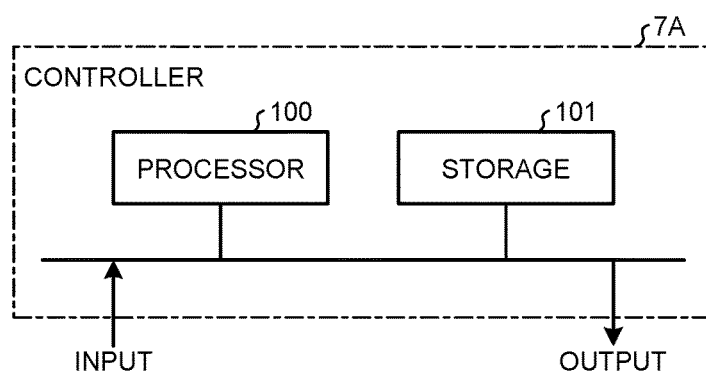
FIG. 3 is a diagram illustrating an example of a hardware configuration of the controller included in the power converter according to the first embodiment.

FIG. 3 is a diagram illustrating an example of a hardware configuration of the controller included in the power converter according to the first embodiment. The controller 7A is configured using processing circuitry such as a microcomputer. The controller 7A is configured using a processor 100 and a storage 101. Although not illustrated in FIG. 3, the storage 101 includes a volatile storage such as a random access memory and a non-volatile auxiliary storage such as a flash memory. Instead of the flash memory, the storage 101 may include the auxiliary storage such as a hard disk.

In the case where the controller 7A incudes the processor 100 and the storage 101, the functions of the controller 7A are implemented by software, firmware, or a combination of software and firmware. The software or firmware is described as a program and stored in the storage 101.

The processor 100 executes the program input from the storage 101, thereby outputting the switching signal X and the drive signals S1 to S6. In this case, the program is input from the auxiliary storage to the processor 100 via the volatile storage. This program can also be said to be a program for causing the controller 7A to execute the functions implemented by the processing circuitry. This program may be provided by a storage medium storing the program, or may be provided by other means such as a communication medium. The processor 100 may also output data such as a calculation result to the volatile storage of the storage 101, or may save the data in the auxiliary storage via the volatile storage.

The processor 100 is, for example, a central processing unit (CPU) or a system large scale integration (LSI), the CPU being also referred to as a central processor, a processing unit, an arithmetic unit, a microprocessor, a microcomputer, or a digital signal processor (DSP).

Figure 4:
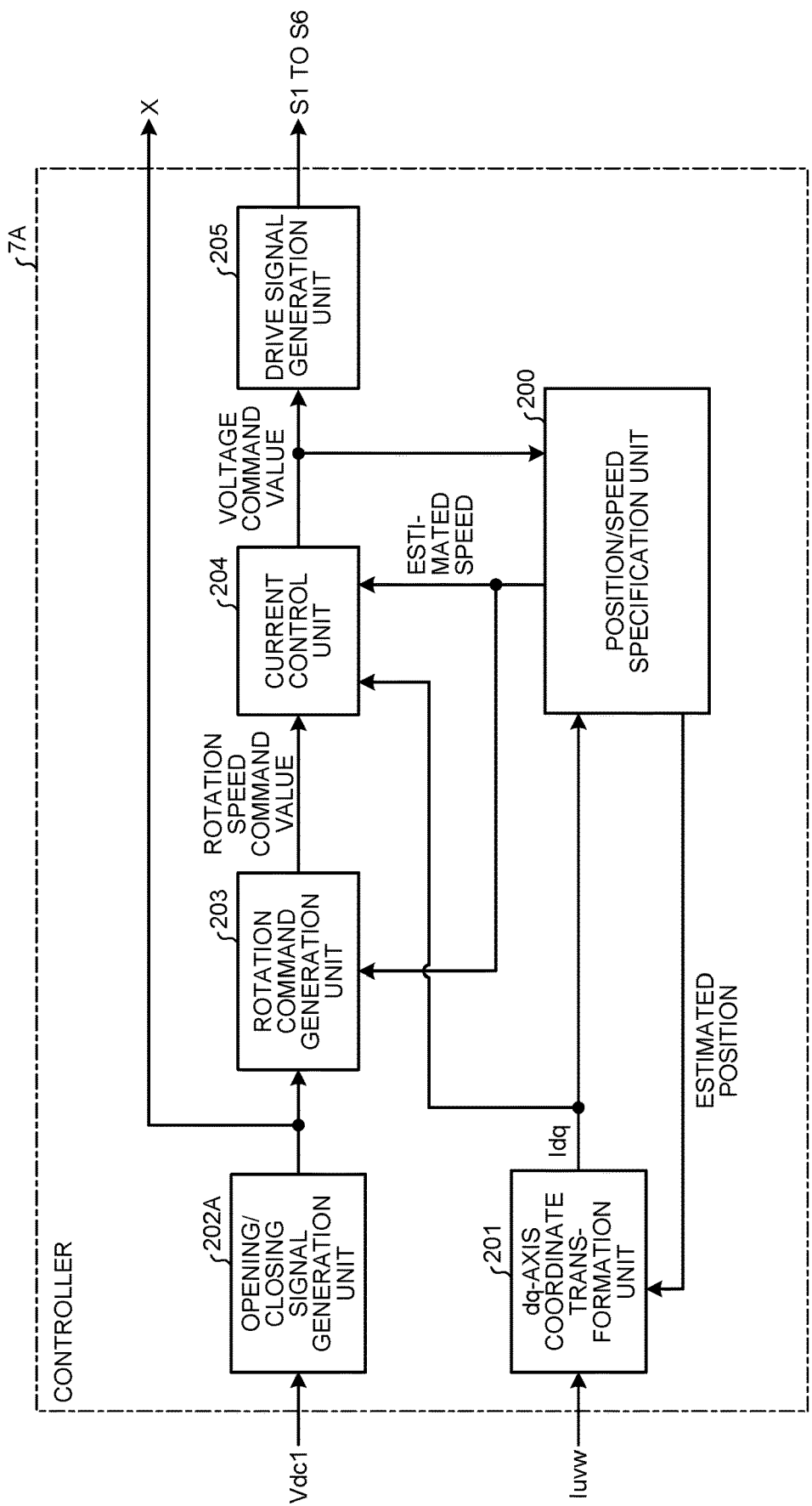
FIG. 4 is a block diagram illustrating an example of a software configuration in the controller included in the power converter according to the first embodiment.

FIG. 4 is a block diagram illustrating an example of a software configuration in the controller included in the power converter according to the first embodiment. The software in the controller 7A includes a position/speed specification unit 200, a dq-axis coordinate transformation unit 201, an opening/closing signal generation unit 202A, a rotation command generation unit 203, a current control unit 204, and a drive signal generation unit 205.

In order to perform vector control on the motor 6, the position/speed specification unit 200 estimates a magnetic pole position and a rotation speed of the motor 6 using a voltage command value output from the current control unit 204 and a dq-axis current Idq output from the dq-axis coordinate transformation unit 201. As such an estimation method, an estimation method called an adaptive observer is generally known. Note that the estimation method executed by the position/speed specification unit 200 is not limited to the above estimation method, and any estimation method may be used as long as the magnetic pole position and the rotation speed of the motor 6 can be properly estimated by the estimation method. Also, a position detector may be attached to the motor 6 and be used as the position/speed specification unit 200.

The position/speed specification unit 200 outputs the estimated magnetic pole position (estimated position) to the dq-axis coordinate transformation unit 201. The position/speed specification unit 200 also outputs the estimated rotation speed (estimated speed) to the rotation command generation unit 203 and the current control unit 204.

The dq-axis coordinate transformation unit 201 receives the detected value Iuvw transmitted from the current detector 32. The dq-axis coordinate transformation unit 201 uses the estimated position of the motor 6 output from the position/speed specification unit 200 to transform the detected value Iuvw from the current detector 32 into a current value (dq-axis current Idq) in dq-axis coordinates as rotating coordinates. The dq-axis coordinates are a coordinate system generally used in vector control of a rotating body such as the motor 6. The dq-axis coordinate transformation unit 201 outputs the dq-axis current Idq to the position/speed specification unit 200 and the current control unit 204.

The opening/closing signal generation unit 202A receives the detected value Vdc1 transmitted from the first voltage detector 31. The opening/closing signal generation unit 202A compares the second voltage threshold (first voltage threshold) with the detected value Vdc1. In a case where the detected value Vdc1 is higher than or equal to the second voltage threshold, the opening/closing signal generation unit 202A generates the switching signal X for opening the first interrupting device 21. On the other hand, in a case where the detected value Vdc1 is lower than the second voltage threshold, the opening/closing signal generation unit 202A generates the switching signal X for closing the first interrupting device 21. The opening/closing signal generation unit 202A transmits the generated switching signal X to the first interrupting device 21 and the rotation command generation unit 203.

Note that the method of generating the switching signal X by the opening/closing signal generation unit 202A is not limited to the above generation method, and any generation method may be used as long as the switching signal X can be properly generated by the generation method. For example, in a case where the power converter 10 includes a timer function, the opening/closing signal generation unit 202A may generate the switching signal X for closing the first interrupting device 21 when the first interrupting device 21 is open for a specific time or longer.

The rotation command generation unit 203 generates a rotation speed command value for the motor 6 on the basis of the switching signal X output from the opening/closing signal generation unit 202A. Specifically, in a case where the switching signal X is a signal as an instruction to close the first interrupting device 21, the rotation command generation unit 203 freely sets the rotation speed command value corresponding to the operation request for the motor 6. On the other hand, in a case where the switching signal X is a signal as an instruction to open the first interrupting device 21, the rotation command generation unit 203 sets the rotation speed command value for the motor 6 on the basis of correlation data 80 described below.

Figure 5:
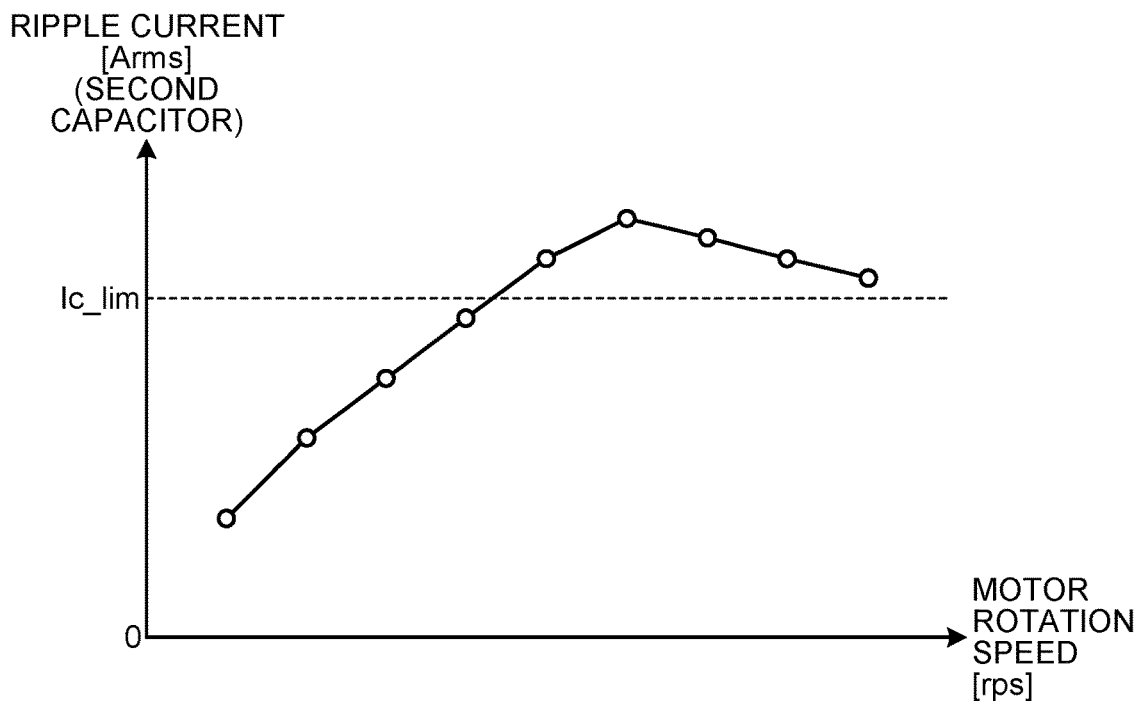
FIG. 5 is a graph for explaining correlation data indicating a relationship between motor rotation speed and ripple current flowing through a second smoothing capacitor when a first interrupting device included in the power converter according to the first embodiment is open.

Here, the correlation data 80 will be described. FIG. 5 is a graph for explaining the correlation data indicating a relationship between the motor rotation speed and the ripple current flowing through the second smoothing capacitor when the first interrupting device included in the power converter according to the first embodiment is open.

In the graph illustrated in FIG. 5, the horizontal axis represents the motor rotation speed that is the rotation speed of the motor 6, and the vertical axis represents the ripple current flowing through the second smoothing capacitor 4. The correlation data 80 is data indicating the correlation between the motor rotation speed and an effective value of the ripple current flowing through the second smoothing capacitor 4 when the first interrupting device 21 is open. Note that the correlation data 80 may be represented by the graph as illustrated in FIG. 5, or may be represented by table data in which the motor rotation speed and the effective value of the ripple current flowing through the second smoothing capacitor 4 are associated with each other.

The correlation data 80 can be obtained by, for example, a method such as a test or simulation actually using the power converter 10. In this case, data actually acquired is subjected to linear interpolation or fitting with an appropriate function so that, even for the motor rotation speed at which data is not actually acquired, the effective value of the ripple current flowing through the second smoothing capacitor 4 can be obtained.

When receiving the switching signal X as the instruction to open the first interrupting device 21 from the opening/closing signal generation unit 202A, the rotation command generation unit 203 sets, on the basis of the correlation data 80, the motor rotation speed at which the effective value of the ripple current flowing through the second smoothing capacitor 4 is less than or equal to a rated ripple current Ic_lim.

Figure 6:
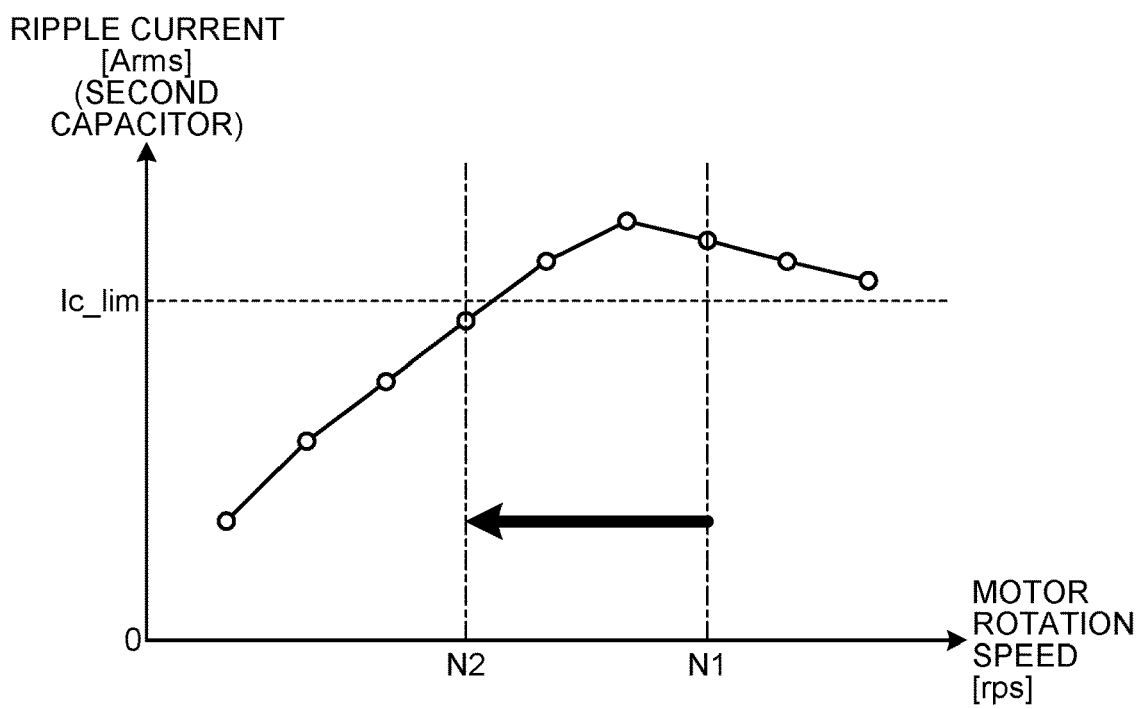
FIG. 6 is a graph for explaining the motor rotation speed that is set using the correlation data by the power converter according to the first embodiment.

FIG. 6 is a graph for explaining the motor rotation speed that is set using the correlation data by the power converter according to the first embodiment. Upon receiving the switching signal X as the instruction to open the first interrupting device 21, the rotation command generation unit 203 included in the controller 7A of the power converter 10 reads the correlation data 80.

The rotation command generation unit 203 sets the motor rotation speed on the basis of the correlation data 80. Specifically, the rotation command generation unit 203 acquires, from the correlation data 80, the effective value of the ripple current flowing through the second smoothing capacitor 4 at a motor rotation speed N1 at the time point (hereinafter referred to as an open instruction time point in some cases) of receiving the switching signal X as the instruction to open the first interrupting device 21 The motor rotation speed N1 at the open instruction time point may be the rotation speed command value at the open instruction time point, or may be calculated on the basis of the estimated speed transmitted from the position/speed specification unit 200 at the open instruction time point.

In a case where the effective value of the ripple current flowing through the second smoothing capacitor at the motor rotation speed N1 acquired from the correlation data 80 is larger than the rated ripple current Ic_lim, the rotation command generation unit 203 selects the motor rotation speed (in FIG. 6, for example, a motor rotation speed N2) at which the effective value of the ripple current flowing through the second smoothing capacitor 4 is less than or equal to the rated ripple current Ic_lim. That is, the rotation command generation unit 203 selects, from among the motor rotation speeds included in the correlation data 80, the motor rotation speed at which the effective value of the ripple current is less than or equal to the rated ripple current Ic_lim.

For example, the rotation command generation unit 203 may select a motor rotation speed obtained by subtracting a specific value from the motor rotation speed at the rated ripple current Ic_lim, or may select a motor rotation speed obtained by multiplying the motor rotation speed at the rated ripple current Ic_lim by a specific value (a value larger than 0 and smaller than or equal to 1). Note that the rotation command generation unit 203 may select the motor rotation speed using not only these selection methods but using another selection method. The rotation command generation unit 203 outputs the selected motor rotation speed as the rotation speed command value.

On the other hand, in a case where the effective value of the ripple current flowing through the second smoothing capacitor 4 at the motor rotation speed N1 is less than or equal to the rated ripple current Ic_lim, the rotation command generation unit 203 continues the operation with the current rotation speed command value.

Note that the correlation data 80 illustrated in FIGS. 5 and 6 may be held in the controller 7A or may be held in a cloud or the like. In a case where the correlation data 80 is held in the cloud or the like, an external device may determine the rotation speed command value on the basis of the correlation data 80. In this case, the power converter 10 receives the rotation speed command value determined by the external device and generates a voltage command value for driving the inverter circuit 5. Note that even in the case where the correlation data 80 is held in the cloud or the like, the power converter 10 may determine the rotation speed command value on the basis of the correlation data 80.

Furthermore, the correlation data 80 illustrated in FIGS. 5 and 6 is not limited to the configuration described above. The correlation data 80 may have any configuration as long as the relationship between the motor rotation speed and the effective value of the ripple current flowing through the second smoothing capacitor 4 when the first interrupting device 21 is open can be properly obtained from the data. For example, a voltage detector may be installed in the alternating current power supply 1, and data considering dependency of an input voltage from the alternating current power supply 1 to the power converter 10 may be used as the correlation data 80. Alternatively, the detected value Vdc1 obtained from the first voltage detector 31 may be used, and data considering dependency of an output voltage from the power converter 10 may be used as the correlation data 80.

The current control unit 204 generates the voltage command value for driving the inverter circuit 5 on the basis of the dq-axis current Idq output from the dq-axis coordinate transformation unit 201, the rotation speed command value output from the rotation command generation unit 203, and the estimated speed of the motor 6 output from the position/speed specification unit 200. As a method of generating such a voltage command value, a generation method using a proportional integral (PI) controller is generally known.

Note that the method of generating the voltage command value by the current control unit 204 is not limited to the above generation method, and any generation method may be used as long as the dq-axis current Idq is appropriately controlled by the generation method. For example, in order to intentionally cause the output of the motor 6 to pulsate, the current control unit 204 may add a method of generating the voltage command value that causes pulsation of the dq-axis current Idq.

On the basis of the voltage command value output from the current control unit 204, the drive signal generation unit 205 generates the drive signals S1 to S6 for performing pulse width modulation (PWM) control of switching on or off the switching elements of the inverter circuit 5. The PWM control is a method generally used for generating the drive signals S1 to S6 of the switching elements from the voltage command value or a current command value. The drive signal generation unit 205 transmits the drive signals S1 to S6 generated to the inverter circuit 5.

Among control processing executed by the controller 7A, a description will be made of an example of processing that generates the switching signal X and the rotation speed command value on the basis of the detected value Vdc1 detected by the first voltage detector 31.

Figure 7:
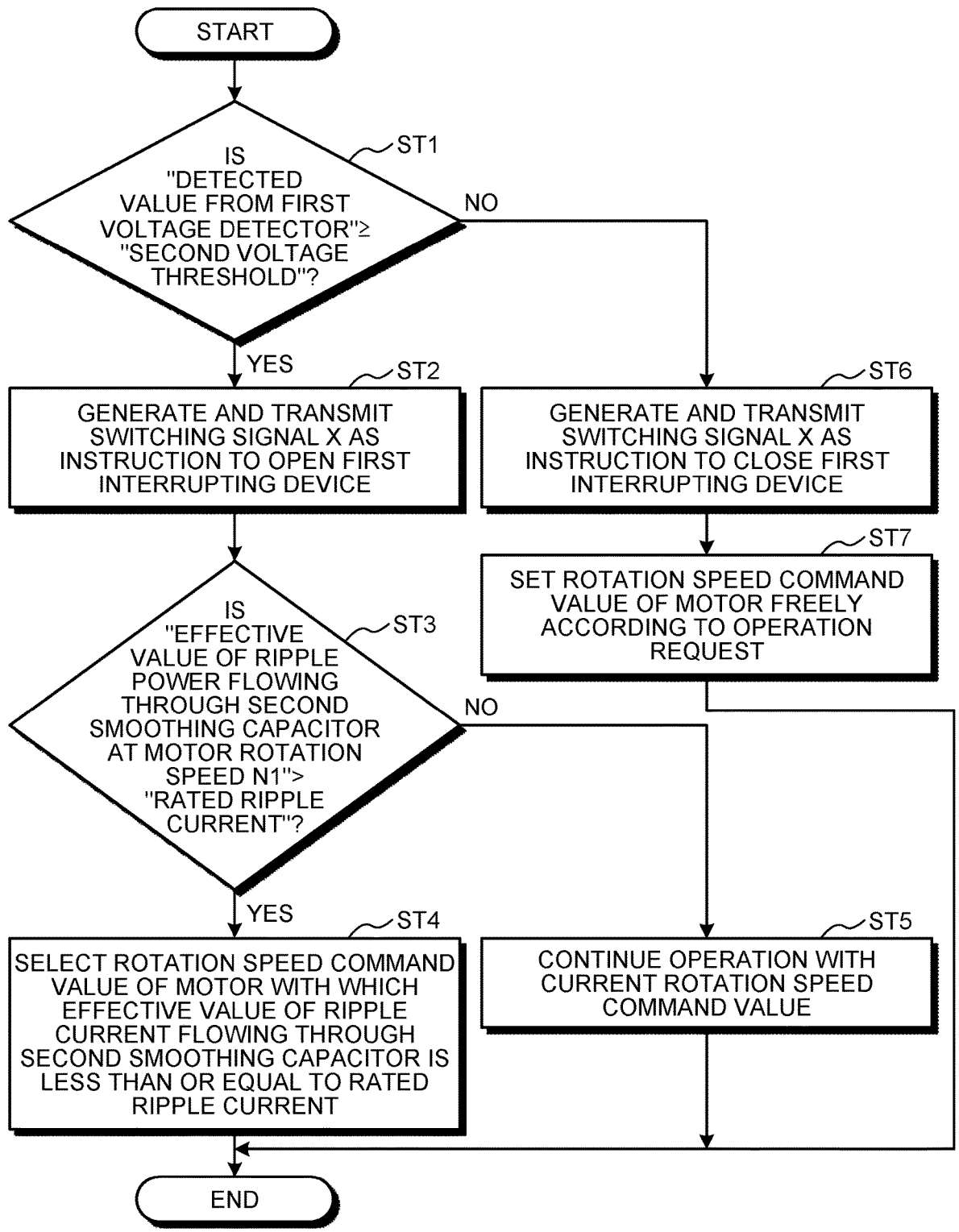
FIG. 7 is a flowchart illustrating a procedure of control processing by the controller of the power converter according to the first embodiment.

FIG. 7 is a flowchart illustrating a procedure of the control processing by the controller of the power converter according to the first embodiment. The flowchart of FIG. 7 illustrates the procedure of the processing in which the controller 7A generates the switching signal X and the rotation speed command value on the basis of the detected value Vdc1.

The opening/closing signal generation unit 202A of the controller 7A receives the detected value Vdc1 from the first voltage detector 31. The opening/closing signal generation unit 202A compares the detected value Vdc1 from the first voltage detector 31 with the second voltage threshold, and determines whether or not "the detected value Vdc1 from the first voltage detector 31"≥"the second voltage threshold" is satisfied (step ST1).

If "the detected value Vdc1 from the first voltage detector 31"≥"the second voltage threshold" is satisfied (Yes in step ST1), the opening/closing signal generation unit 202A generates and transmits the switching signal X as the instruction to open the first interrupting device 21 (step ST2). In this case, the opening/closing signal generation unit 202A transmits the switching signal X generated to the first interrupting device 21 and the rotation command generation unit 203.

The rotation command generation unit 203 acquires, from the correlation data 80, the effective value of the ripple current flowing through the second smoothing capacitor 4 at the motor rotation speed N1 at the time point of receiving the switching signal X as the instruction to open the first interrupting device 21 That is, the rotation command generation unit 203 acquires, from the correlation data 80, the effective value of the ripple current corresponding to the motor rotation speed N1 at the open instruction time point.

The rotation command generation unit 203 compares the effective value of the ripple current flowing through the second smoothing capacitor 4 at the motor rotation speed N1 with the rated ripple current. The rotation command generation unit 203 determines whether or not "the effective value of the ripple current flowing through the second smoothing capacitor 4 at the motor rotation speed N1">"the rated ripple current" is satisfied (step ST3).

If "the effective value of the ripple current flowing through the second smoothing capacitor 4 at the motor rotation speed N1"≥"the rated ripple current" is satisfied (Yes in step ST3), the rotation command generation unit 203 selects the rotation speed command value of the motor 6 with which the effective value of the ripple current flowing through the second smoothing capacitor 4 is less than or equal to the rated ripple current (step ST4). The rotation command generation unit 203 selects, for example, the motor rotation speed N2 illustrated in FIG. 6. The rotation command generation unit 203 outputs the selected rotation speed command value to the current control unit 204.

If "the effective value of the ripple current flowing through the second smoothing capacitor 4 at the motor rotation speed N1"≤"the rated ripple current" is satisfied (No in step ST3), the rotation command generation unit 203 continues the operation with the current rotation speed command value (step ST5). That is, the rotation command generation unit 203 outputs the current rotation speed command value to the current control unit 204.

In the processing of step ST1, if "the detected value Vdc1 from the first voltage detector 31"<"the second voltage threshold" is satisfied (No in step ST1), the opening/closing signal generation unit 202A generates and transmits the switching signal X as the instruction to close the first interrupting device 21 (step ST6). That is, if "the detected value Vdc1"<"the second voltage threshold" is satisfied with the first interrupting device 21 being open, the opening/closing signal generation unit 202A generates and transmits the switching signal X as the instruction to close the first interrupting device 21. In this case, the opening/closing signal generation unit 202A transmits the switching signal X generated to the first interrupting device 21 and the rotation command generation unit 203.

Since the first interrupting device 21 is closed, the rotation command generation unit 203 freely sets the rotation speed command value of the motor 6 according to the operation request (step ST7). The rotation command generation unit 203 outputs the set rotation speed command value to the current control unit 204.

After steps ST4, ST5, and ST7, the current control unit 204 generates the voltage command value using the rotation speed command value output from the rotation command generation unit 203, the dq-axis current Idq output from the dq-axis coordinate transformation unit 201, and the estimated speed of the motor 6 output from the position/speed specification unit 200. The current control unit 204 outputs the generated voltage command value to the position/speed specification unit 200 and the drive signal generation unit 205.

On the basis of the voltage command value output from the current control unit 204, the drive signal generation unit 205 generates the drive signals S1 to S6 for performing PWM control of switching on or off the switching elements of the inverter circuit 5. The drive signal generation unit 205 transmits the drive signals S1 to S6 generated to the inverter circuit 5.

As described above, in the first embodiment, the first voltage detector 31 detects, as the detected value Vdc1, the voltage applied to the second smoothing capacitor 4 having the second breakdown voltage higher than the first voltage threshold as the breakdown voltage. The detected value Vdc1 corresponds to the voltage applied to the first smoothing capacitor 3.

In a case where the detected value Vdc1 detected by the first voltage detector 31 is higher than or equal to the second voltage threshold, the controller 7A opens the first interrupting device 21 connected in series to the first smoothing capacitor 3. Furthermore, the controller 7A controls the rotation speed of the motor 6 such that the ripple current flowing through the second smoothing capacitor 4 whose breakdown voltage is higher than the first voltage threshold is less than or equal to the rated ripple current.

As a result, the power converter 10 can operate with high reliability. That is, the power converter 10 can operate with high reliability by keeping the ripple current flowing through the second smoothing capacitor 4 to the rated ripple current or less while keeping the applied voltage across the first smoothing capacitor 3 to its breakdown voltage or lower.

As described above, in the first embodiment, the power converter 10 opens the first interrupting device 21 in the case where the detected value Vdc1 detected by the first voltage detector 31 is higher than or equal to the second voltage threshold. Furthermore, the power converter 10 controls the rotation speed of the motor 6 such that the ripple current flowing through the second smoothing capacitor 4 is less than or equal to the rated ripple current. As a result, the power converter 10 can keep the ripple current flowing through the second smoothing capacitor 4 to the rated ripple current or less. Therefore, the power converter 10 can prevent a reduction in life of the second smoothing capacitor 4.

Second Embodiment

Next, a second embodiment will be described with reference to FIGS. 8 to 10. In the second embodiment, the power converter 10 drives and controls the motor 6 in a motor drive system in which a second converter circuit is connected in parallel to the first converter circuit 2.

Figure 8:
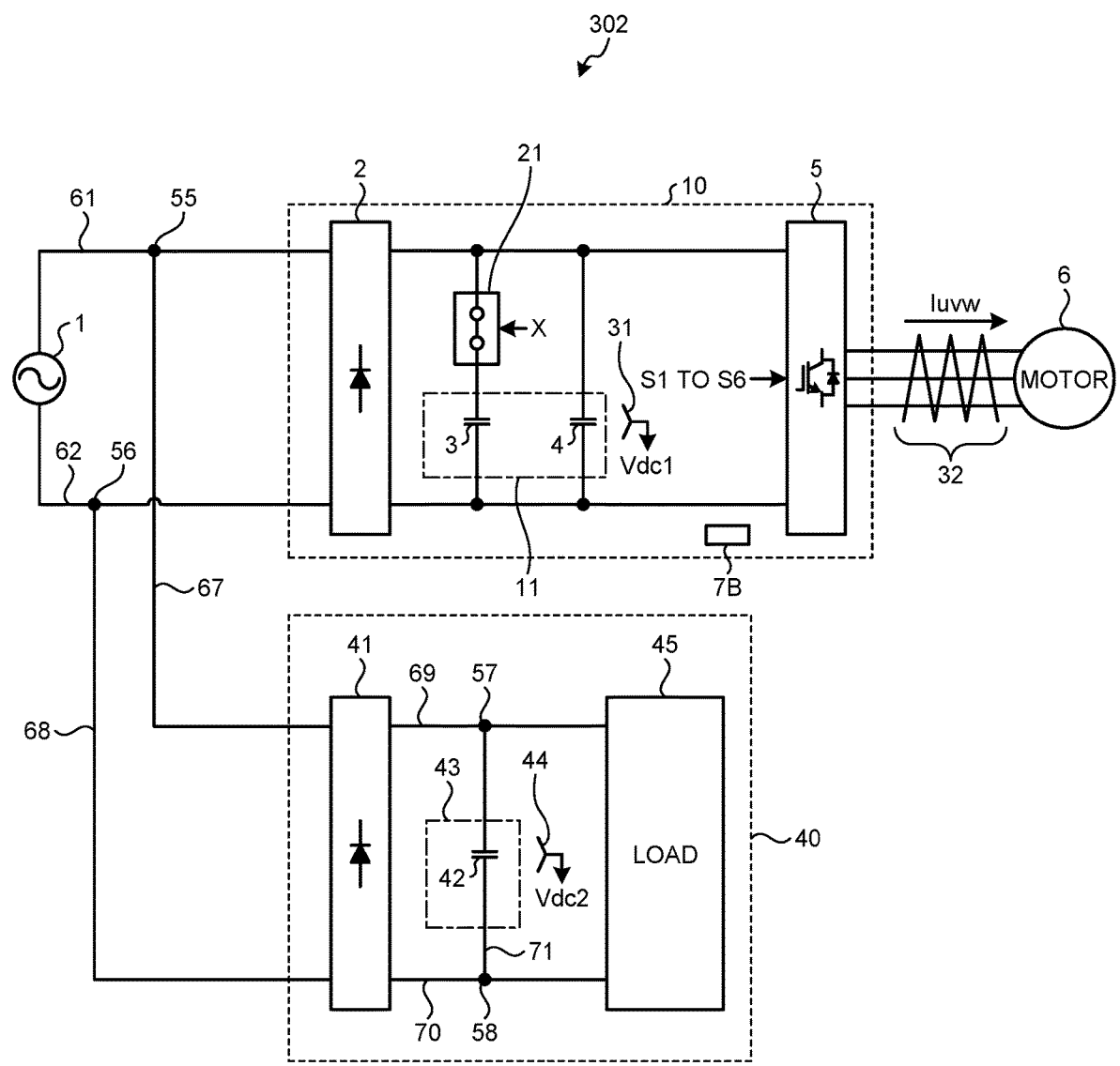
FIG. 8 is a diagram illustrating a configuration of a motor drive system including the power converter according to a second embodiment.

FIG. 8 is a diagram illustrating a configuration of the motor drive system including the power converter according to the second embodiment. Components in FIG. 8 that achieve the same functions as those of the motor drive system 301 of the first embodiment illustrated in FIG. 1 are assigned the same reference numerals as those in FIG. 1, and redundant description will be omitted. Note that FIG. 8 omits the illustration of reference numerals of the connection points 51 to 54 and the connection lines 63 to 66.

A motor drive system 302 includes the power converter 10, the motor 6, the current detector 32, and a drive unit 40. That is, the motor drive system 302 includes the drive unit 40 in addition to the components of the motor drive system 301.

The drive unit 40 includes a second converter circuit 41 connected in parallel with the first converter circuit 2, a second smoothing unit 43 including a third smoothing capacitor 42, a second voltage detector 44, and a load 45. The drive unit 40 is connected to connection lines 67 and 68. The connection line 67 is connected to a connection point 55 on the connection line 61, and the connection line 68 is connected to a connection point 56 on the connection line 62.

In the drive unit 40, the second converter circuit 41 is connected to the connection lines 67 and 68. Moreover, the second converter circuit 41 and the load 45 are connected via connection lines 69 and 70.

A connection point 57 disposed on the connection line 69 and a connection point 58 disposed on the connection line 70 are connected via a connection line 71. The third smoothing capacitor 42 is disposed on the connection line 71. That is, the connection point 57 is connected to the connection point 58 via the third smoothing capacitor 42.

Moreover, the power converter 10 includes a controller 7B instead of the controller 7A. The controller 7B controls, on the basis of detection signals from the first voltage detector 31, the second voltage detector 44, and the current detector 32, opening and closing of the first interrupting device 21 and switching on and off of each switching element of the inverter circuit 5.

As with the first converter circuit 2, the second converter circuit 41 is a diode rectifier circuit in which four diode elements are bridge-connected. Note that, as with the first converter circuit 2, the type of the diode element used in the second converter circuit 41 is not limited to the fast recovery diode or the soft recovery diode. The diode element used in the second converter circuit 41 may be an element using a material such as SiC, GaN, or Ga2O3. Also, the second converter circuit 41 may be a circuit that uses switching elements to form a step-up circuit, a step-down circuit, a step-up/down circuit, or the like.

A third breakdown voltage that is a breakdown voltage of the third smoothing capacitor 42 is higher than or equal to the second breakdown voltage of the second smoothing capacitor 4. Note that the third smoothing capacitor 42 has such a capacitance that the ripple current flowing through the third smoothing capacitor 42 is less than or equal to the rated ripple current for all predetermined rotation speed conditions.

Moreover, the third smoothing capacitor 42 has the breakdown voltage and the capacitance such that a ripple amount of an applied voltage is less than or equal to a value obtained by multiplying the breakdown voltage of the smoothing capacitor by a percentage (for example, 20 to 40%) determined by chemical properties of the smoothing capacitor.

The second smoothing unit 43 is not limited to the above configuration, and may have any configuration as long as the voltage can be properly smoothed. For example, the second smoothing unit 43 (third smoothing capacitor 42) may have a configuration (smoothing capacitor group) in which two or more smoothing capacitors are connected in series such that the total breakdown voltage (third breakdown voltage) is higher than or equal to the second breakdown voltage of the second smoothing capacitor 4.

The second smoothing unit 43 may also have a configuration in which either two or more of smoothing capacitors each having a breakdown voltage higher than or equal to the second breakdown voltage of the second smoothing capacitor 4, or the smoothing capacitor groups described above are connected in parallel.

The load 45 includes an inverter circuit and a motor similar to the inverter circuit 5 and the motor 6. Note that the load 45 is not limited to the above configuration, and a load having any configuration may be used.

The second voltage detector 44 detects the applied voltage across the third smoothing capacitor 42 and outputs the detected value as a detected value Vdc2 to the controller 7B. The detected value Vdc2 detected by the second voltage detector 44 is a second detected value.

Figure 9:
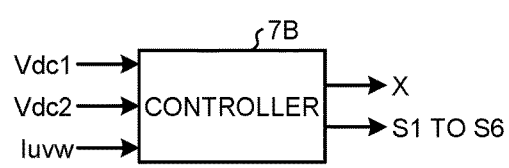
FIG. 9 is a diagram illustrating a configuration of a controller included in the power converter according to the second embodiment.

FIG. 9 is a diagram illustrating a configuration of the controller included in the power converter according to the second embodiment. The controller 7B included in the power converter 10 of the second embodiment receives the detected value Vdc1 transmitted from the first voltage detector 31. The controller 7B also receives the detected value Vdc2 transmitted from the second voltage detector 44. The controller 7B also receives the detected value Iuvw transmitted from the current detector 32.

In addition, on the basis of the detected value Vdc1 from the first voltage detector 31 or the detected value Vdc2 from the second voltage detector 44, the controller 7B transmits the switching signal X to the first interrupting device 21. Moreover, on the basis of the detected value Vdc1 from the first voltage detector 31 or the detected value Vdc2 from the second voltage detector 44 and the detected value Iuvw from the current detector 32, the controller 7B transmits the drive signals S1 to S6 to the switching elements of the inverter circuit 5. The controller 7B can thus control opening and closing of the first interrupting device 21 and switching on and off of the switching elements of the inverter circuit 5.

Note that, in a case where the first converter circuit 2, the second converter circuit 41, or the load 45 includes switching elements, the controller 7B transmits the drive signals S1 to S6 for controlling switching on and off of these switching elements to these switching elements.

Figure 10:
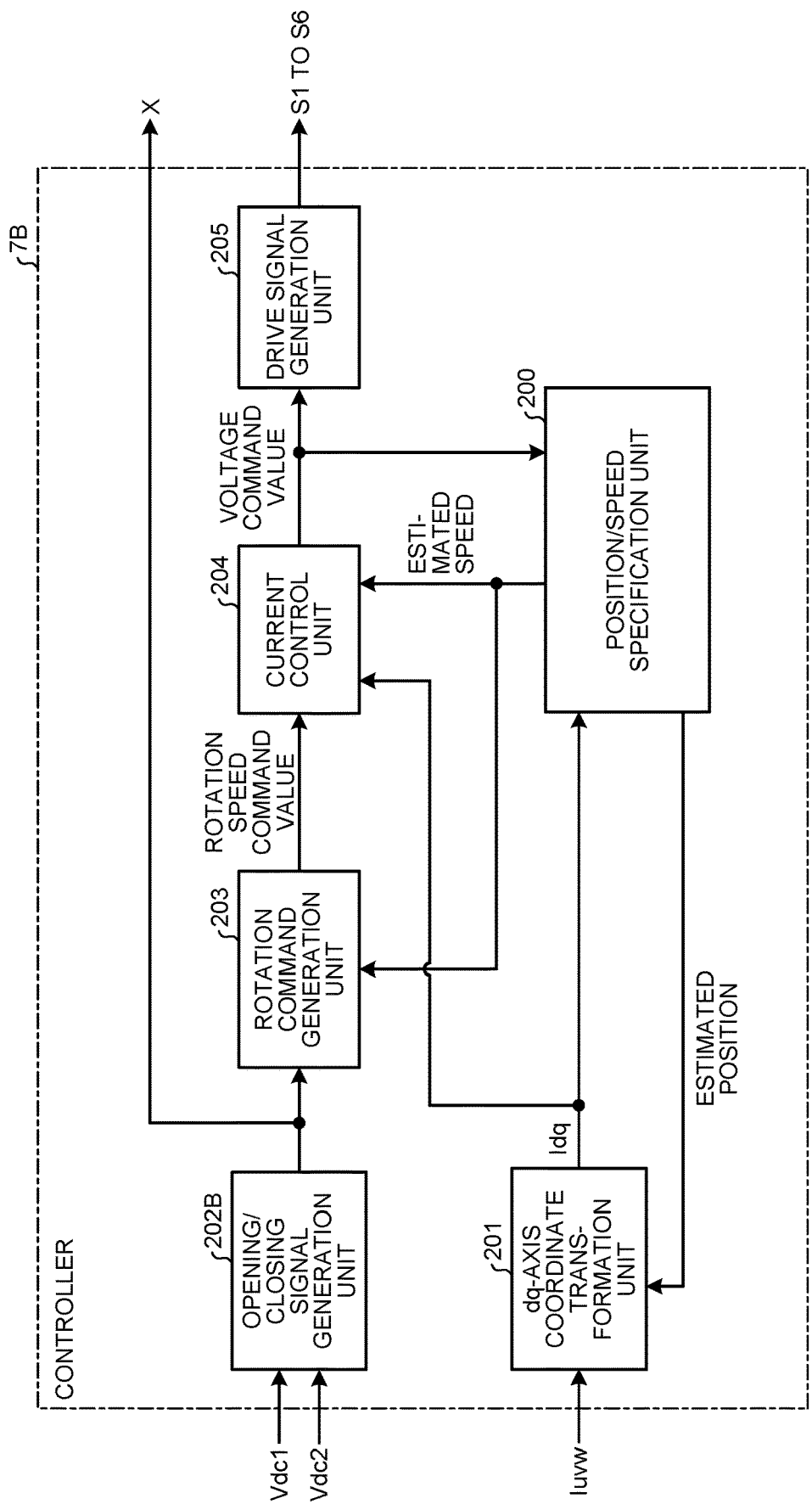
FIG. 10 is a block diagram illustrating an example of a software configuration in the controller included in the power converter according to the second embodiment.

FIG. 10 is a block diagram illustrating an example of a software configuration in the controller included in the power converter according to the second embodiment. Components in FIG. 10 that achieve the same functions as those of the controller 7A of the first embodiment illustrated in FIG. 4 are assigned the same reference numerals as those in FIG. 4, and redundant description will be omitted.

The software in the controller 7B includes the position/speed specification unit 200, the dq-axis coordinate transformation unit 201, an opening/closing signal generation unit 202B, the rotation command generation unit 203, the current control unit 204, and the drive signal generation unit 205. That is, as compared with the software in the controller 7A, the software in the controller 7B includes the opening/closing signal generation unit 202B instead of the opening/closing signal generation unit 202A.

The opening/closing signal generation unit 202B receives at least one of the detected value Vdc1 transmitted from the first voltage detector 31 and the detected value Vdc2 transmitted from the second voltage detector 44.

Note that in a case where the first voltage detector 31 transmits the detected value Vdc1 to the opening/closing signal generation unit 202B, the power converter 10 need not include the second voltage detector 44. Similarly, in a case where the second voltage detector 44 transmits the detected value Vdc2 to the opening/closing signal generation unit 202B, the power converter 10 need not include the first voltage detector 31. That is, since the detected value Vdc1 and the detected value Vdc2 are substantially the same value, either the detected value Vdc1 or the detected value Vdc2 need only be input to the opening/closing signal generation unit 202B.

The opening/closing signal generation unit 202B adopts either the detected value Vdc1 from the first voltage detector 31 or the detected value Vdc2 from the second voltage detector 44 as a voltage value (hereinafter referred to as a switching voltage value in some cases) for generating the switching signal X.

The opening/closing signal generation unit 202B compares the second voltage threshold with the switching voltage value. In a case where the switching voltage value is higher than or equal to the second voltage threshold, the opening/closing signal generation unit 202B generates the switching signal X for opening the first interrupting device 21. On the other hand, in a case where the switching voltage value is lower than the second voltage threshold, the opening/closing signal generation unit 202B generates the switching signal X for closing the first interrupting device 21. The opening/closing signal generation unit 202B transmits the generated switching signal X to the first interrupting device 21 and the rotation command generation unit 203.

Note that the method of generating the switching signal X by the opening/closing signal generation unit 202B is not limited to the above generation method, and any generation method may be used as long as the switching signal X can be properly generated by the generation method. For example, in a case where both the detected value Vdc1 from the first voltage detector 31 and the detected value Vdc2 from the second voltage detector 44 are higher than or equal to the second voltage threshold, the opening/closing signal generation unit 202B may generate the switching signal X for opening the first interrupting device 21. The opening/closing signal generation unit 202B may also adopt an average value of the detected value Vdc1 from the first voltage detector 31 and the detected value Vdc2 from the second voltage detector 44 as the switching voltage value.

Moreover, in a case where the power converter 10 includes a timer function, the opening/closing signal generation unit 202B may generate the switching signal X for closing the first interrupting device 21 when the first interrupting device 21 is open for a specific time or longer.

The processing in which the controller 7B generates the switching signal X and the rotation speed command value is different only in step ST1 from the procedure described with reference to FIG. 7 of the first embodiment. Specifically, in the first embodiment, the opening/closing signal generation unit 202A determines whether or not "the detected value Vdc1 from the first voltage detector 31"≥"the second voltage threshold" is satisfied, whereas in the second embodiment, the opening/closing signal generation unit 202A determines whether or not "the switching voltage value"≥"the second voltage threshold" is satisfied.

That is, in the processing in which the controllers 7A and 7B generate the switching signal X and the rotation speed command value, in the flowchart of FIG. 7, the detected value Vdc1 from the first voltage detector 31 used in step ST1 is simply replaced with the switching voltage value. The processing in which the controllers 7A and 7B generate the switching signal X and the rotation speed command value is the same in step ST2 and subsequent steps.

As described above, in the second embodiment, the first voltage detector 31 detects the voltage applied to the first smoothing capacitor 3, or the second voltage detector 44 detects the voltage applied to the third smoothing capacitor 42. In a case where the switching voltage value determined by the detected value from at least one of the first voltage detector 31 and the second voltage detector 44 is higher than or equal to the second voltage threshold, the controller 7B opens the first interrupting device 21 connected in series to the first smoothing capacitor 3. Furthermore, the controller 7B controls the rotation speed of the motor 6 such that the ripple current flowing through the second smoothing capacitor 4 whose breakdown voltage is higher than the first voltage threshold is less than or equal to the rated ripple current.

Therefore, the power converter 10 of the second embodiment can obtain an effect similar to that of the power converter 10 of the first embodiment. That is, in the second embodiment as well, the power converter 10 can operate with high reliability and can prevent a reduction in life of the second smoothing capacitor 4.

Third Embodiment

Next, a third embodiment will be described with reference to FIGS. 11 to 14. In the third embodiment, a second interrupting device is disposed on the connection line 61 between the alternating current power supply 1 and the first converter circuit 2, and the power converter 10 controls opening and closing of the second interrupting device.

Figure 11:
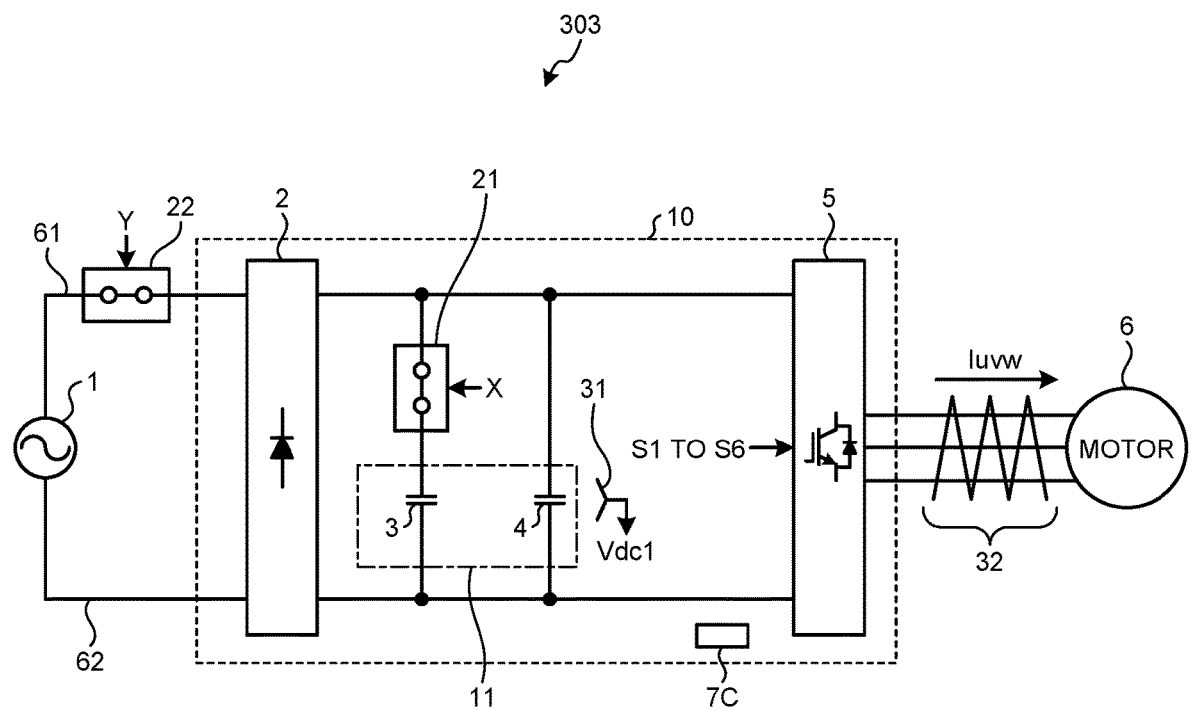
FIG. 11 is a diagram illustrating a configuration of a motor drive system including the power converter according to a third embodiment.

FIG. 11 is a diagram illustrating a configuration of a motor drive system including the power converter according to the third embodiment. Components in FIG. 11 that achieve the same functions as those of the motor drive system 301 of the first embodiment illustrated in FIG. 1 are assigned the same reference numerals as those in FIG. 1, and redundant description will be omitted. Note that FIG. 11 omits the illustration of reference numerals of the connection points 51 to 54 and the connection lines 63 to 66.

A motor drive system 303 includes the power converter 10, the motor 6, the current detector 32, and a second interrupting device 22. That is, the motor drive system 303 includes the second interrupting device 22 in addition to the components of the motor drive system 301.

The second interrupting device 22 is disposed on the connection line 61. That is, the second interrupting device 22 is disposed between the alternating current power supply 1 and the first converter circuit 2. Note that the second interrupting device 22 may be disposed inside the power converter 10 or may be disposed outside the power converter 10.

Moreover, the power converter 10 includes a controller 7C instead of the controller 7A. The controller 7C controls, on the basis of detection signals from the first voltage detector 31 and the current detector 32, opening and closing of the first interrupting device 21, opening and closing of the second interrupting device 22, and switching on and off of each switching element of the inverter circuit 5.

For the second interrupting device 22, a mechanical relay is used as with the first interrupting device 21, but a switching element formed of a semiconductor including a wide band gap semiconductor may be used. That is, for the second interrupting device 22, a switching element such as an IGBT, a MOSFET, a SiC-MOSFET, a GaN-FET, a GaN-HEMT, or a Ga2O3-MOSFET may be used.

Figure 12:
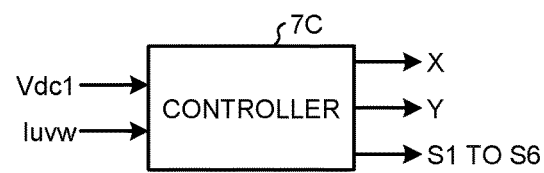
FIG. 12 is a diagram illustrating a configuration of a controller included in the power converter according to the third embodiment.

FIG. 12 is a diagram illustrating a configuration of the controller included in the power converter according to the third embodiment. The controller 7C included in the power converter 10 of the third embodiment receives the detected value Vdc1 transmitted from the first voltage detector 31. The controller 7C also receives the detected value Iuvw transmitted from the current detector 32.

In addition, on the basis of the detected value Vdc1, the controller 7C transmits the switching signal X to the first interrupting device 21. Also, on the basis of the detected value Vdc1, the controller 7C transmits a switching signal Y to the second interrupting device 22. The switching signal Y is a signal for switching an open/closed state of the second interrupting device 22. Moreover, on the basis of the detected value Vdc1 and the detected value Iuvw, the controller 7C transmits the drive signals S1 to S6 to the switching elements of the inverter circuit 5. The controller 7C can thus control opening and closing of the first interrupting device 21, opening and closing of the second interrupting device 22, and switching on and off of the switching elements of the inverter circuit 5.

Figure 13:
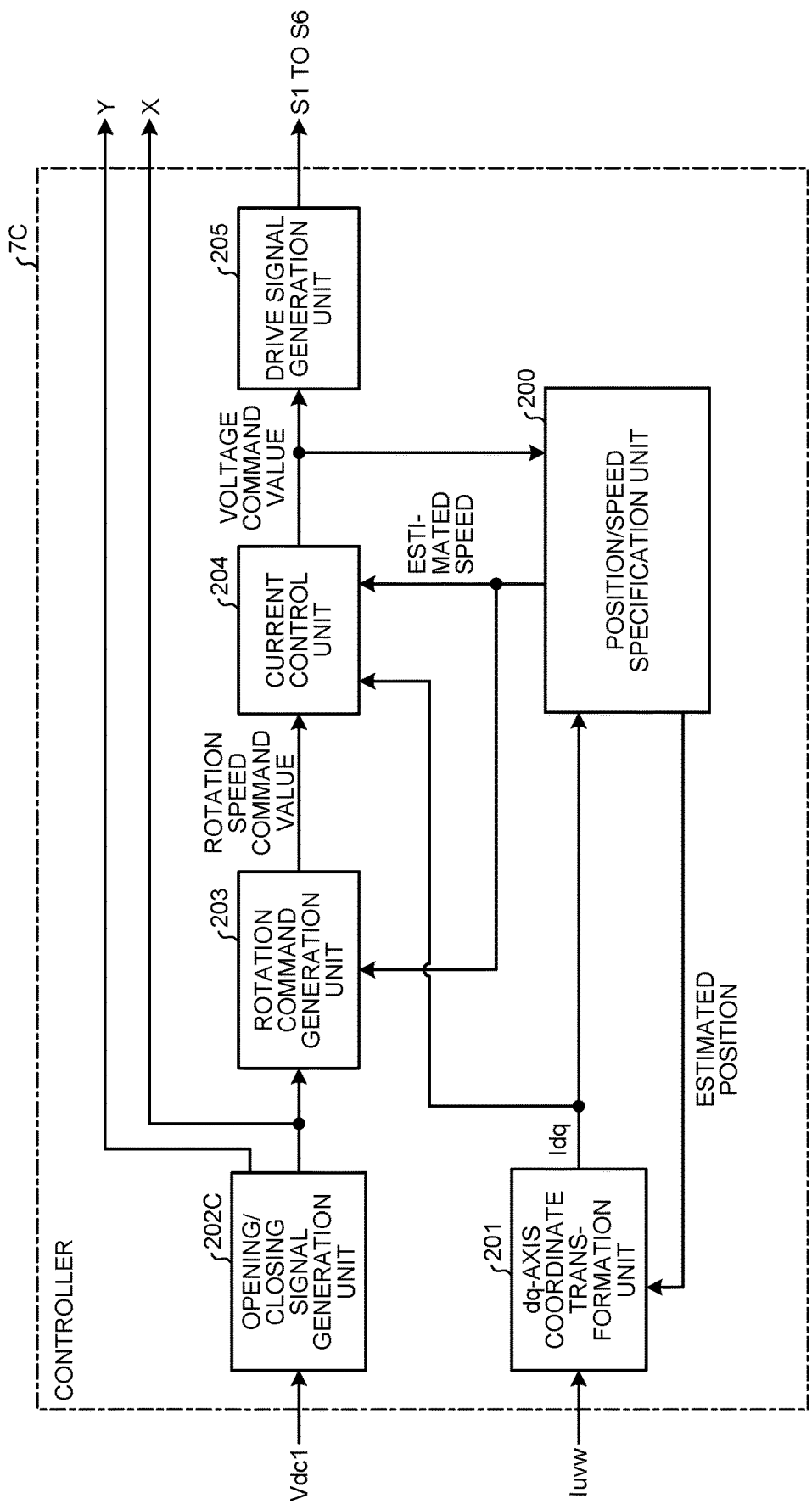
FIG. 13 is a block diagram illustrating an example of a software configuration in the controller included in the power converter according to the third embodiment.

FIG. 13 is a block diagram illustrating an example of a software configuration in the controller included in the power converter according to the third embodiment. Components in FIG. 13 that achieve the same functions as those of the controller 7A of the first embodiment illustrated in FIG. 4 are assigned the same reference numerals as those in FIG. 4, and redundant description will be omitted.

The software in the controller 7C includes the position/speed specification unit 200, the dq-axis coordinate transformation unit 201, an opening/closing signal generation unit 202C, the rotation command generation unit 203, the current control unit 204, and the drive signal generation unit 205. That is, as compared with the software in the controller 7A, the software in the controller 7C includes the opening/closing signal generation unit 202C instead of the opening/closing signal generation unit 202A.

The opening/closing signal generation unit 202C receives the detected value Vdc1 transmitted from the first voltage detector 31. The opening/closing signal generation unit 202C compares the second voltage threshold with the detected value Vdc1 from the first voltage detector 31. In a case where the detected value Vdc1 is higher than or equal to the second voltage threshold, the opening/closing signal generation unit 202C generates the switching signal X for opening the first interrupting device 21. On the other hand, in a case where the detected value Vdc1 is lower than the second voltage threshold, the opening/closing signal generation unit 202C generates the switching signal X for closing the first interrupting device 21.

In addition, the opening/closing signal generation unit 202C compares the detected value Vdc1 with the third voltage threshold that is higher than the first voltage threshold and has the same value as the second breakdown voltage of the second smoothing capacitor 4 ("first voltage threshold"<"third voltage threshold" "second breakdown voltage"). In a case where the detected value Vdc1 is higher than or equal to the third voltage threshold, the opening/closing signal generation unit 202C generates the switching signal Y for opening the second interrupting device 22. On the other hand, in a case where the detected value Vdc1 is lower than the third voltage threshold, the opening/closing signal generation unit 202C generates the switching signal Y for closing the second interrupting device 22.

The opening/closing signal generation unit 202C transmits the generated switching signal X to the first interrupting device 21 and the rotation command generation unit 203. The opening/closing signal generation unit 202C also transmits the generated switching signal Y to the second interrupting device 22.

In addition, the opening/closing signal generation unit 202C has a function of closing the interrupting devices in order, i.e., the first interrupting device 21 and subsequently the second interrupting device 22 when an open state of both of the first interrupting device 21 and the second interrupting device 22 lasts for a specific time or longer.

Note that the method of generating the switching signals X and Y by the opening/closing signal generation unit 202C is not limited to the above generation method, and any generation method may be used as long as the switching signals X and Y can be properly generated by the generation method.

Among control processing executed by the controller 7C, a description will be made of an example of processing that generates the switching signals X and Y and the rotation speed command value on the basis of the detected value Vdc1 detected by the first voltage detector 31.

Figure 14:
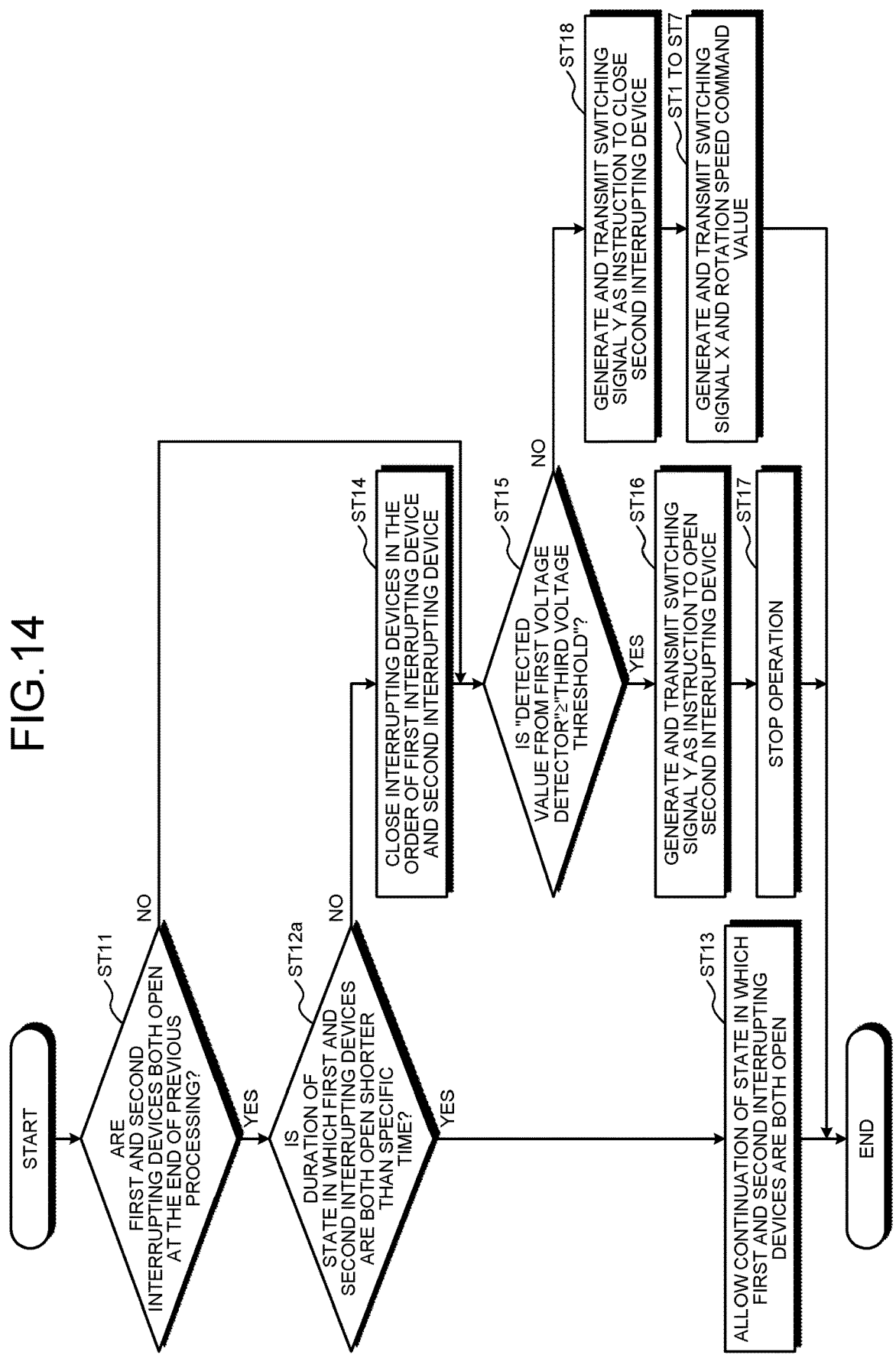
FIG. 14 is a flowchart illustrating a procedure of control processing by the controller of the power converter according to the third embodiment.

FIG. 14 is a flowchart illustrating a procedure of the control processing by the controller of the power converter according to the third embodiment. The flowchart of FIG. 14 illustrates the processing in which the controller 7C generates the switching signals X and Y and the rotation speed command value on the basis of the detected value Vdc1.

The opening/closing signal generation unit 202C of the controller 7C determines the open/closed states of the first interrupting device 21 and the second interrupting device 22 at the end of the previous processing. Specifically, the opening/closing signal generation unit 202C determines whether or not the first interrupting device 21 and the second interrupting device 22 (hereinafter referred to as first and second interrupting devices in some cases) are both open at the end of the previous processing (step ST11).

If determining that the first and second interrupting devices are both open at the end of the previous processing (Yes in step ST11), the opening/closing signal generation unit 202C acquires the duration of the state in which the first and second interrupting devices are both open. The duration of the state in which the first and second interrupting devices are both open is measured using a timer function or the like.

The opening/closing signal generation unit 202C determines whether or not the duration of the state in which the first and second interrupting devices are both open is shorter than a specific time (step ST12a). In other words, the opening/closing signal generation unit 202C determines whether or not the continuation of the state in which the first and second interrupting devices are both open has passed a specific time.

If determining that the duration of the state in which the first and second interrupting devices are both open is shorter than the specific time (Yes in step ST12a), the opening/closing signal generation unit 202C allows the continuation of the state in which the first and second interrupting devices are both open (step ST13). That is, the opening/closing signal generation unit 202C generates the switching signals X and Y for allowing the continuation of the state in which the first and second interrupting devices are both open.

The opening/closing signal generation unit 202C transmits the generated switching signal X to the first interrupting device 21 and the rotation command generation unit 203. The opening/closing signal generation unit 202C also transmits the generated switching signal Y to the second interrupting device 22.

If determining that the duration of the state in which the first and second interrupting devices are both open is longer than or equal to the specific time (No in step ST12a), the opening/closing signal generation unit 202C closes the interrupting devices in the order of the first interrupting device 21 and the second interrupting device 22 (step ST14). As a result, the motor drive system 303 can return to the normal operation.

The opening/closing signal generation unit 202C closes the interrupting devices in the order of the first interrupting device 21 and the second interrupting device 22, thereby being able to prevent an excessive inrush current from flowing into the power converter 10.

The opening/closing signal generation unit 202C closes the interrupting devices in the order of the first interrupting device 21 and the second interrupting device 22, and then compares the detected value Vdc1 from the first voltage detector 31 with the third voltage threshold. The opening/closing signal generation unit 202C then determines whether or not "the detected value Vdc1 from the first voltage detector 31"≥"the third voltage threshold" is satisfied (step ST15).

If "the detected value Vdc1 from the first voltage detector 31"≥"the third voltage threshold" is satisfied (Yes in step ST15), the opening/closing signal generation unit 202C generates the switching signal Y as the instruction to open the second interrupting device 22 and transmits the switching signal Y to the second interrupting device 22 (step ST16). The controller 7C thereafter stops the operation of the motor 6 (step ST17).

Also, in the processing of step ST11, if the opening/closing signal generation unit 202C determines that either the first or second interrupting device is closed at the end of the previous processing (No in step ST11), the controller 7C executes the processing of step ST15 and subsequent steps.

In the processing of step ST15, if the opening/closing signal generation unit 202C determines that "the detected value Vdc1 from the first voltage detector 31"<"the third voltage threshold" is satisfied (No in step ST15), the opening/closing signal generation unit 202C generates the switching signal Y as the instruction to close the second interrupting device 22 and transmits the switching signal Y to the second interrupting device 22 (step ST18).

The controller 7C thereafter executes the processing of steps ST1 to ST7 described with reference to FIG. 7. That is, the controller 7C generates and transmits the switching signal X and the rotation speed command value (steps ST1 to ST7).

Note that the opening/closing signal generation unit 202C executes the processing of both steps ST16 and ST17 if "the detected value Vdc1 from the first voltage detector 31"≥"the third voltage threshold" is satisfied, but the opening/closing signal generation unit 202C may execute the processing of at least one of steps ST16 and ST17.

As described above, in the third embodiment, the controller 7C opens the second interrupting device 22 and stop the operation of the motor 6 in the case where the detected value Vdc1 of the voltage applied to the second smoothing capacitor 4 having the breakdown voltage higher than the first voltage threshold is higher than or equal to the third voltage threshold that is greater than the first voltage threshold and has the same value as the breakdown voltage of the second smoothing capacitor 4.

Moreover, in the third embodiment, in the case where the detected value Vdc1 of the voltage applied to the second smoothing capacitor 4 is higher than or equal to the second voltage threshold, the controller 7C opens the first interrupting device 21 connected in series to the first smoothing capacitor 3. Furthermore, the controller 7C controls the rotation speed of the motor 6 such that the ripple current flowing through the second smoothing capacitor 4 is less than or equal to the rated ripple current. Therefore, as with the first embodiment, the power converter 10 can operate with high reliability and can prevent a reduction in life of the second smoothing capacitor 4.

Fourth Embodiment

Next, a fourth embodiment will be described with reference to FIGS. 15 to 19. In the fourth embodiment, a motor drive system has a configuration that is a combination of the motor drive systems 302 and 303. That is, in the motor drive system of the fourth embodiment, the second converter circuit 41 is connected in parallel to the first converter circuit 2, and the second interrupting device 22 is disposed on the connection line 61 between the alternating current power supply 1 and the first converter circuit 2.

Figure 15:
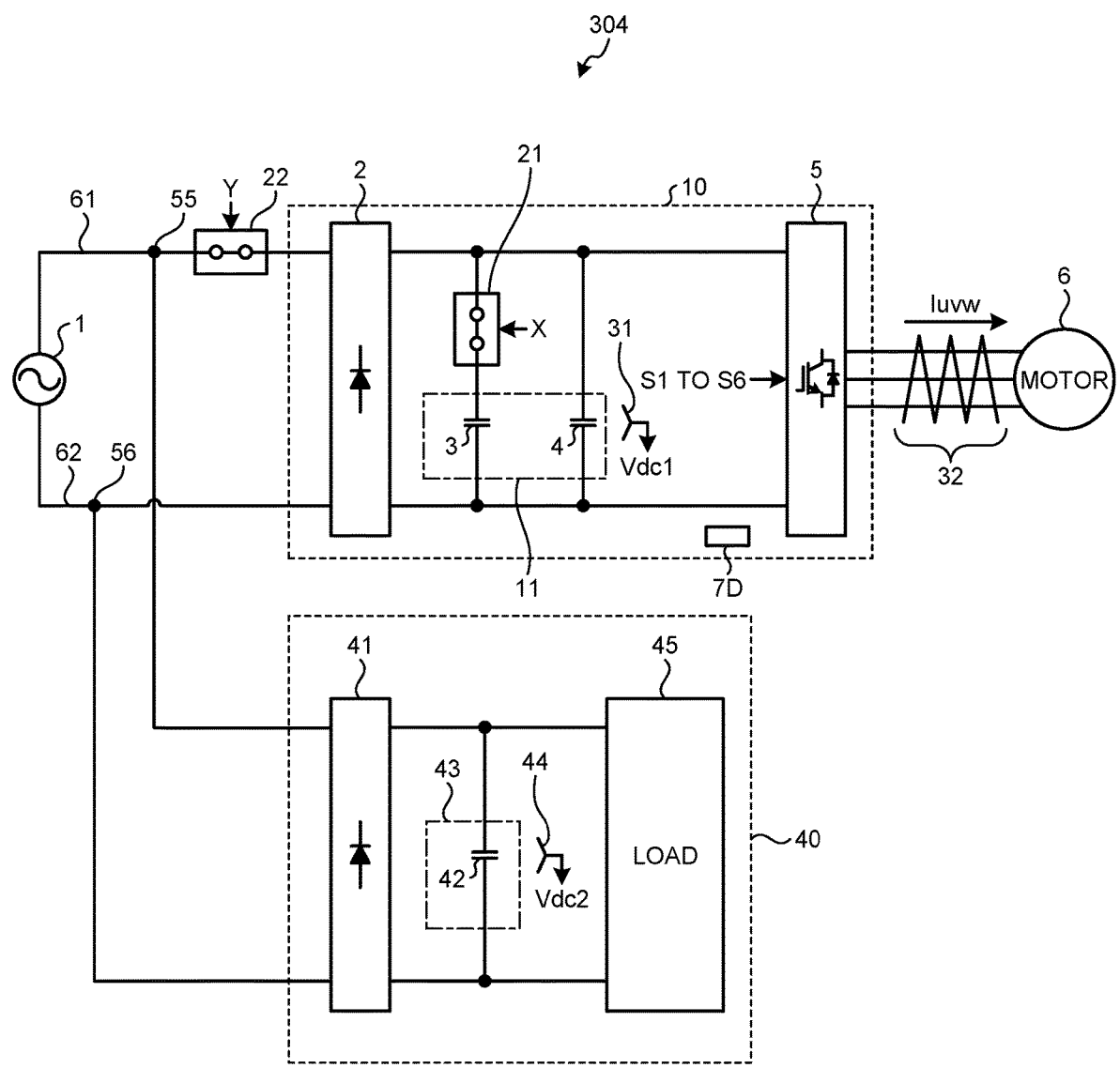
FIG. 15 is a diagram illustrating a configuration of a motor drive system including the power converter according to a fourth embodiment.

FIG. 15 is a diagram illustrating the configuration of the motor drive system including the power converter according to the fourth embodiment. Components in FIG. 15 that achieve the same functions as those of the motor drive system 302 of the second embodiment or the motor drive system 303 of the third embodiment are assigned the same reference numerals as those in the corresponding motor drive system of the second or third embodiment, and redundant description will be omitted. Note that FIG. 15 omits the illustration of reference numerals of the connection points 51 to 54, 57, and 58 and the connection lines 63 to 70.

A motor drive system 304 includes the power converter 10, the motor 6, the current detector 32, the second interrupting device 22, and the drive unit 40. That is, the motor drive system 304 includes the second interrupting device 22 in addition to the components of the motor drive system 302.

In the fourth embodiment, the second interrupting device 22 is disposed between the connection point 55 and the first converter circuit 2 on the connection line 61. Note that the second interrupting device 22 may be disposed inside the power converter 10 or may be disposed outside the power converter 10.

Moreover, the power converter 10 includes a controller 7D instead of the controller 7A. On the basis of detection signals from the first voltage detector 31, the second voltage detector 44, and the current detector 32, the controller 7D controls opening and closing of the first interrupting device 21, opening and closing of the second interrupting device 22, and switching on and off of each switching element of the inverter circuit 5.

Figure 16:
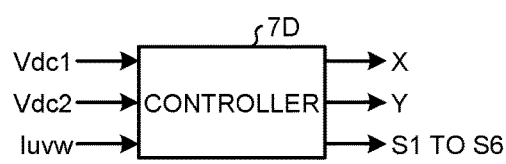
FIG. 16 is a diagram illustrating a configuration of a controller included in the power converter according to the fourth embodiment.

FIG. 16 is a diagram illustrating a configuration of the controller included in the power converter according to the fourth embodiment. The controller 7D included in the power converter 10 of the fourth embodiment receives the detected value Vdc1 transmitted from the first voltage detector 31. The controller 7D also receives the detected value Vdc2 transmitted from the second voltage detector 44. The controller 7D also receives the detected value Iuvw transmitted from the current detector 32.

In addition, on the basis of the detected value Vdc1 from the first voltage detector 31, the controller 7D transmits the switching signal X to the first interrupting device 21. Also, on the basis of the detected value Vdc2 from the second voltage detector 44, the controller 7D transmits the switching signal Y to the second interrupting device 22. Moreover, on the basis of the detected value Vdc1 from the first voltage detector 31 and the detected value Iuvw from the current detector 32, the controller 7D transmits the drive signals S1 to S6 to the switching elements of the inverter circuit 5. The controller 7D can thus control opening and closing of the first interrupting device 21, opening and closing of the second interrupting device 22, and switching on and off of the switching elements of the inverter circuit 5.

Note that, in a case where the first converter circuit 2, the second converter circuit 41, or the load 45 includes switching elements, the controller 7D transmits the drive signals S1 to S6 for controlling switching on and off of these switching elements to these switching elements.

Figure 17:
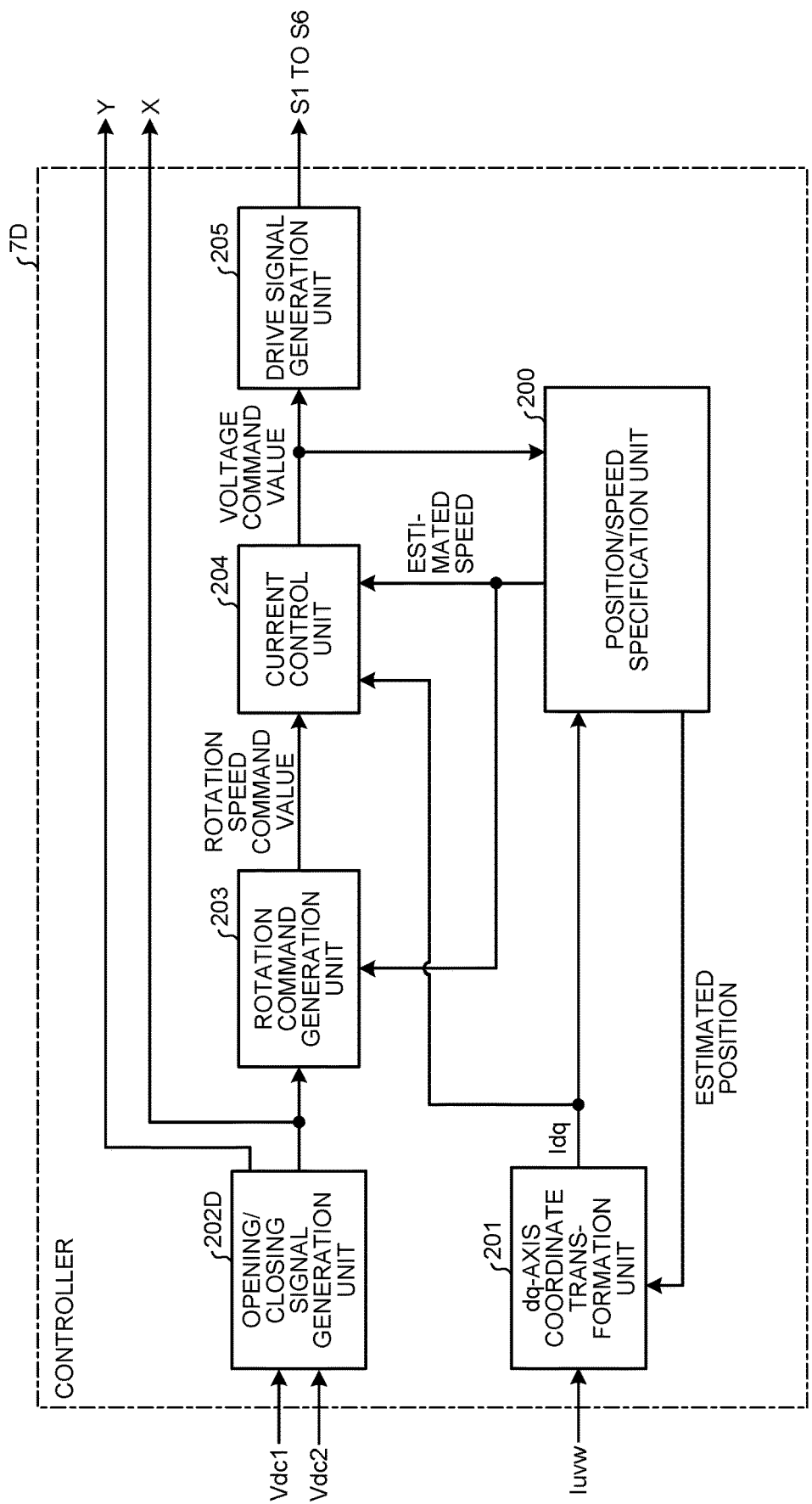
FIG. 17 is a block diagram illustrating an example of a software configuration in the controller included in the power converter according to the fourth embodiment.

FIG. 17 is a block diagram illustrating an example of a software configuration in the controller included in the power converter according to the fourth embodiment. Components in FIG. 17 that achieve the same functions as those of the controller 7A of the first embodiment illustrated in FIG. 4 are assigned the same reference numerals as those in FIG. 4, and redundant description will be omitted.

The software in the controller 7D includes the position/speed specification unit 200, the dq-axis coordinate transformation unit 201, an opening/closing signal generation unit 202D, the rotation command generation unit 203, the current control unit 204, and the drive signal generation unit 205. That is, as compared with the software in the controller 7A, the software in the controller 7D includes the opening/closing signal generation unit 202D instead of the opening/closing signal generation unit 202A.

The opening/closing signal generation unit 202D receives the detected value Vdc1 transmitted from the first voltage detector 31 and the detected value Vdc2 transmitted from the second voltage detector 44.

The opening/closing signal generation unit 202D compares the second voltage threshold with the detected value Vdc2 from the second voltage detector 44. In a case where the detected value Vdc2 is less than the second voltage threshold, the opening/closing signal generation unit 202D closes the interrupting devices in the order of the first interrupting device 21 and the second interrupting device 22.

In addition, the opening/closing signal generation unit 202D compares the detected value Vdc1 with the third voltage threshold that is higher than the first voltage threshold and has the same value as the second breakdown voltage of the second smoothing capacitor 4. In a case where the detected value Vdc1 is higher than or equal to the third voltage threshold, the opening/closing signal generation unit 202D generates the switching signal Y for opening the second interrupting device 22. On the other hand, in a case where the detected value Vdc1 is lower than the third voltage threshold, the opening/closing signal generation unit 202D generates the switching signal Y for closing the second interrupting device 22.

The opening/closing signal generation unit 202D also compares the second voltage threshold with the detected value Vdc2 from the second voltage detector 44. In a case where the detected value Vdc2 is higher than or equal to the second voltage threshold, the opening/closing signal generation unit 202D generates the switching signal X for opening the first interrupting device 21, as with the opening/closing signal generation unit 202B. On the other hand, in a case where the detected value Vdc2 is lower than the second voltage threshold, the opening/closing signal generation unit 202D generates the switching signal X for closing the first interrupting device 21.

The opening/closing signal generation unit 202D transmits the generated switching signal X to the first interrupting device 21 and the rotation command generation unit 203. The opening/closing signal generation unit 202D also transmits the generated switching signal Y to the second interrupting device 22.

As described above, the opening/closing signal generation unit 202D has both the function of the opening/closing signal generation unit 202B and the function of the opening/closing signal generation unit 202C.

Note that the method of generating the switching signals X and Y by the opening/closing signal generation unit 202D is not limited to the above generation method, and any generation method may be used as long as the switching signals X and Y can be properly generated by the generation method.

Among control processing executed by the controller 7D, a description will be made of an example of processing that generates the switching signals X and Y and the rotation speed command value on the basis of the detected value Vdc1 detected by the first voltage detector 31 and the detected value Vdc2 detected by the second voltage detector 44.

Figure 18:
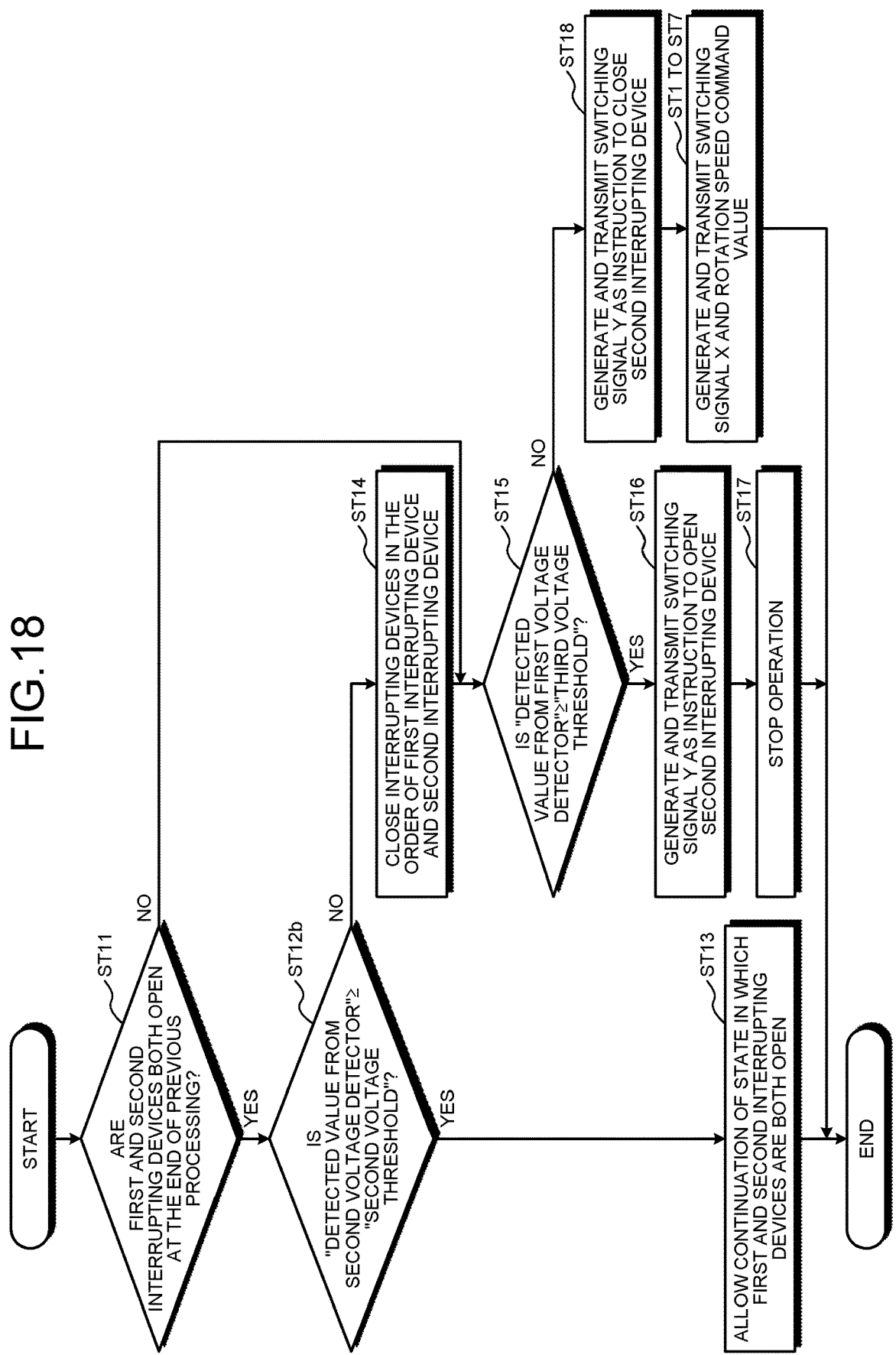
FIG. 18 is a flowchart illustrating a procedure of control processing by the controller of the power converter according to the fourth embodiment.

FIG. 18 is a flowchart illustrating a procedure of the control processing by the controller of the power converter according to the fourth embodiment. The flowchart of FIG. 18 illustrates the processing in which the controller 7D generates the switching signals X and Y and the rotation speed command value on the basis of the detected value Vdc1 and the detected value Vdc2.

While the controller 7C executes the processing of step ST12a, the controller 7D executes processing of step ST12b. The processing of steps ST11, ST13 to ST18, and ST1 to ST7 executed by the controller 7C and the processing of steps ST11, ST13 to ST18, and ST1 to ST7 executed by the controller 7D are the same processing and are executed in the same procedure.

If determining that the first and second interrupting devices are both open at the end of the previous processing (Yes in step ST11), the controller 7D acquires the duration of the state in which the first and second interrupting devices are both open using a timer function or the like.

The opening/closing signal generation unit 202D then compares the detected value Vdc2 from the second voltage detector 44 with the second voltage threshold, and determines whether or not "the detected value Vdc2 from the second voltage detector 44"≥"the second voltage threshold" is satisfied (step ST12b).

If "the detected value Vdc2 from the second voltage detector 44"≥"the second voltage threshold" is satisfied (Yes in step ST12b), the opening/closing signal generation unit 202D executes the processing of step ST13. On the other hand, if "the detected value Vdc2 from the second voltage detector 44"<"the second voltage threshold" is satisfied (No in step ST12b), the opening/closing signal generation unit 202D executes the processing of step ST14 and subsequent steps. As a result, the controller 7D need not to stop the operation of the motor 6 for a specific time.

Figure 19:
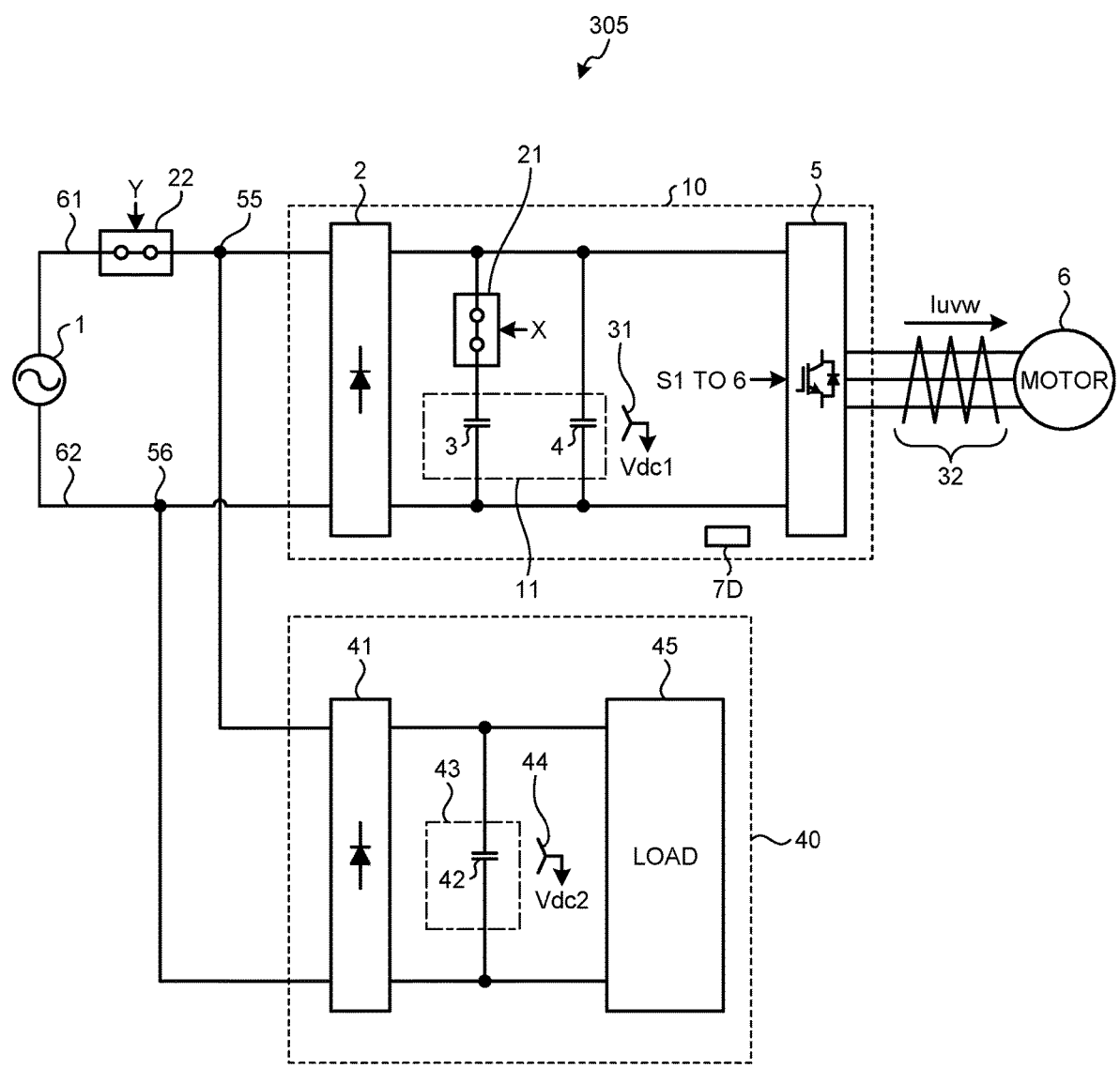
FIG. 19 is a diagram illustrating an example of another configuration of a motor drive system including the power converter according to the fourth embodiment.

FIG. 19 is a diagram illustrating an example of another configuration of a motor drive system including the power converter according to the fourth embodiment. Components in FIG. 19 that achieve the same functions as those of the motor drive system 304 illustrated in FIG. 15 are assigned the same reference numerals as those in FIG. 15, and redundant description will be omitted. Note that, as in FIG. 15, FIG. 19 omits the illustration of reference numerals of the connection points 51 to 54, 57, and 58 and the connection lines 63 to 70.

As with the motor drive system 304, a motor drive system 305 includes the power converter 10, the motor 6, the current detector 32, the second interrupting device 22, and the drive unit 40.

In the motor drive system 305, the second interrupting device 22 is disposed between the connection point 55 and the alternating current power supply 1 on the connection line 61. In the motor drive system 305, the power converter 10 executes the operation similar to that in the motor drive system 304. Thus, the preferred operation of the motor drive system 305 can be implemented by combining the operations described in the first to fourth embodiments.

Note that, in the motor drive system 305, when the controller 7D generates the switching signals X and Y and the rotation speed command value, the switching voltage value may be used instead of the detected value Vdc2 detected by the second voltage detector 44. That is, the opening/closing signal generation unit 202D may compare the second voltage threshold with the detected value Vdc1 instead of comparing the second voltage threshold with the detected value Vdc2.

Thus, in the fourth embodiment, the controller 7D opens the second interrupting device 22 and stop the operation of the motor 6 in a case where the detected value Vdc1 of the voltage applied to the second smoothing capacitor 4, the breakdown voltage of which is higher than the first voltage threshold, is higher than or equal to the third voltage threshold that is greater than the first voltage threshold and has the same value as the breakdown voltage of the second smoothing capacitor 4.

Moreover, in the fourth embodiment, in a case where the detected value Vdc1 of the voltage applied to the second smoothing capacitor 4 is higher than or equal to the second voltage threshold, the controller 7D opens the first interrupting device 21 connected in series to the first smoothing capacitor 3 whose breakdown voltage is equal to the second voltage threshold. Furthermore, the controller 7D controls the rotation speed of the motor 6 such that the ripple current flowing through the second smoothing capacitor 4 whose breakdown voltage is higher than the first voltage threshold is less than or equal to the rated ripple current. Therefore, as with the first embodiment, the power converter 10 can operate with high reliability and can prevent a reduction in life of the second smoothing capacitor 4.

The configurations illustrated in the above embodiments each merely illustrate an example so that another known technique can be combined, the embodiments can be combined together, or the configurations can be partially omitted and/or modified without departing from the scope of the present disclosure.

The invention claimed is:

1. A power converter comprising:
a first converter circuit to convert an alternating current voltage from an alternating current power supply into a direct current voltage;
an inverter circuit to convert the direct current voltage obtained by conversion by the first converter circuit into an alternating current voltage, and supply the alternating current voltage to a motor;
a first smoothing unit connected between the first converter circuit and the inverter circuit, the first smoothing unit including a first smoothing capacitor and a second smoothing capacitor, the first smoothing capacitor having a first breakdown voltage equal to a second voltage threshold, the second smoothing capacitor having a second breakdown voltage higher than a first voltage threshold, the first voltage threshold being a value higher than or equal to the second voltage threshold, the first smoothing capacitor and the second smoothing capacitor being connected in parallel;
a first interrupting device connected in series to the first smoothing capacitor;
a first voltage detector to detect an applied voltage across the second smoothing capacitor; and
a controller to, in a case where a first detected value as a detected value of the applied voltage detected by the first voltage detector is higher than or equal to the second voltage threshold, open the first interrupting device and control a rotation speed of the motor such that a ripple current flowing through the second smoothing capacitor is less than or equal to a rated ripple current.

2. The power converter according to claim 1, wherein the controller
closes the first interrupting device in a case where the first detected value is lower than the second voltage threshold.

3. The power converter according to claim 1, wherein the controller
closes the first interrupting device in a case where an open state of the first interrupting device lasts a specific time.

4. The power converter according to claim 1, further comprising:
a second converter circuit connected in parallel to the first converter circuit to convert the alternating current voltage from the alternating current power supply into a direct current voltage;
a load to be supplied with the direct current voltage obtained by conversion by the second converter circuit;
a second smoothing unit connected between the second converter circuit and the load, the second smoothing unit including a third smoothing capacitor having a third breakdown voltage higher than or equal to the second breakdown voltage; and
a second voltage detector to detect an applied voltage across the third smoothing capacitor, wherein
the controller
opens the first interrupting device in a case where a switching voltage value is higher than or equal to the second voltage threshold, the switching voltage being a detected value of at least one of the applied voltage detected by the first voltage detector and the applied voltage detected by the second voltage detector.

5. The power converter according to claim 4, wherein
the third smoothing capacitor is
a smoothing capacitor group including two or more smoothing capacitors connected in series and having a total breakdown voltage that is the third breakdown voltage.

6. The power converter according to claim 4, wherein
the third smoothing capacitor is defined by:
two or more parallel-connected smoothing capacitors each having the third breakdown voltage; or
two or more parallel-connected smoothing capacitor groups each including two or more smoothing capacitors connected in series and having a total breakdown voltage that is the third breakdown voltage.

7. The power converter according to claim 1, further comprising
a second interrupting device connected between the alternating current power supply and the first converter circuit, wherein
the controller
opens the second interrupting device and stops the operation of the motor in a case where the first detected value is higher than or equal to a third voltage threshold, the third voltage threshold being a value larger than the first voltage threshold and equal to the second breakdown voltage.

8. The power converter according to claim 7, wherein the controller
closes the first interrupting device and subsequently closes the second interrupting device in a case where an open state of both of the first interrupting device and the second interrupting device lasts a specific time.

9. The power converter according to claim 1, further comprising:
a second converter circuit connected in parallel to the first converter circuit to convert the alternating current voltage from the alternating current power supply into a direct current voltage;
a load to be supplied with the direct current voltage obtained by conversion by the second converter circuit;
a second smoothing unit connected between the second converter circuit and the load, the second smoothing unit including a third smoothing capacitor having a third breakdown voltage higher than or equal to the second breakdown voltage;
a second interrupting device connected between the alternating current power supply and the first converter circuit; and
a second voltage detector to detect an applied voltage across the third smoothing capacitor, wherein
the controller
opens the second interrupting device and stops the operation of the motor in a case where the first detected value is higher than or equal to a third voltage threshold, the third voltage threshold being a value larger than the first voltage threshold and equal to the second breakdown voltage.

10. The power converter according to claim 9, wherein the controller
closes the first interrupting device and subsequently closes the second interrupting device in a case where a second detected value is lower than the second voltage threshold with the first interrupting device and the second interrupting device both open, the second detected value being a detected value of the applied voltage detected by the second voltage detector.

11. The power converter according to claim 9, wherein the third smoothing capacitor is
a smoothing capacitor group including two or more smoothing capacitors connected in series and having a total breakdown voltage that is the third breakdown voltage.

12. The power converter according to claim 9, wherein the third smoothing capacitor is defined by:
two or more parallel-connected smoothing capacitors each having the third breakdown voltage; or
two or more parallel-connected smoothing capacitor groups each including two or more smoothing capacitors connected in series and having a total breakdown voltage that is the third breakdown voltage.

13. The power converter according to claim 1, wherein
on the basis of correlation data in which the rotation speed of the motor is associated with an effective value of the ripple current flowing through the second smoothing capacitor, the controller
controls the rotation speed of the motor such that the ripple current flowing through the second smoothing capacitor is less than or equal to the rated ripple current.

14. The power converter according to claim 13, wherein the controller
selects, from among the rotation speeds included in the correlation data, one rotation speed at which the ripple current flowing through the second smoothing capacitor is less than or equal to the rated ripple current, and controls the rotation speed of the motor to achieve the selected rotation speed.

15. The power converter according to claim 1, wherein in the first smoothing unit,
three or more smoothing capacitors including the first smoothing capacitor and the second smoothing capacitor are connected in parallel, wherein
of the three or more smoothing capacitors, low breakdown voltage capacitors each having a breakdown voltage lower than or equal to the first voltage threshold and connected in series to a specific interrupting device, and wherein,
of the low breakdown voltage capacitors, the first smoothing capacitor is connected in series to the first interrupting device.

16. The power converter according to claim 1, wherein the first smoothing capacitor and the second smoothing capacitor have
capacitances that: allow a ripple current less than or equal to the rated ripple current to flow through each of the first smoothing capacitor and the second smoothing capacitor under all predetermined rotation speed conditions with the first interrupting device closed; and allow a ripple current less than or equal to the rated ripple current to flow through the second smoothing capacitor under at least one of the rotation speed conditions with the first interrupting device open.

17. The power converter according to claim 1, wherein the first smoothing capacitor and the second smoothing capacitor have
the first and second breakdown voltages and capacitances such that, with the first interrupting device closed, all predetermined rotation speed conditions are satisfied, and with the first interrupting device open, at least one of the rotation speed conditions is satisfied.

18. The power converter according to claim 1, wherein the first interrupting device is a mechanical relay or a switching element formed of a semiconductor including a wide band gap semiconductor.

19. A motor drive system comprising:
a motor; and
a power converter to convert and supply, to the motor, an alternating current voltage from an alternating current power supply, wherein
the power converter includes:
a first converter circuit to convert the alternating current voltage from the alternating current power supply into a direct current voltage;
an inverter circuit to convert the direct current voltage obtained by conversion by the first converter circuit into an alternating current voltage, and supply the alternating current voltage to the motor;
a first smoothing unit connected between the first converter circuit and the inverter circuit, the first smoothing including a first smoothing capacitor and a second smoothing capacitor, the first smoothing capacitor having a first breakdown voltage equal to a second voltage threshold, the second smoothing capacitor having a second breakdown voltage higher than a first voltage threshold, the first voltage threshold being a value higher than or equal to the second voltage threshold, the first smoothing capacitor and the second smoothing capacitor being connected in parallel;

a first interrupting device connected in series to the first smoothing capacitor;

a first voltage detector to detect an applied voltage across the second smoothing capacitor; and a controller to, in a case where a first detected value as a detected value of the applied voltage detected by the first voltage detector is higher than or equal to the second voltage threshold, open the first interrupting device and control a rotation speed of the motor such that a ripple current flowing through the second smoothing capacitor is less than or equal to a rated ripple current.

20. A power conversion method comprising:

converting an alternating current voltage from an alternating current power supply into a direct current voltage;

smoothing the direct current voltage, the first voltage threshold being a value higher than or equal to the second voltage threshold;

converting the smoothed direct current voltage into an alternating current voltage, and supplying the alternating current voltage to a motor;

detecting an applied voltage across a second smoothing capacitor; and in a case where a first detected value as a detected value of the detected applied voltage is higher than or equal to a second voltage threshold, opening a first interrupting device connected in series to a first smoothing capacitor and controlling a rotation speed of the motor such that a ripple current flowing through the second smoothing capacitor is less than or equal to a rated ripple current, the first smoothing capacitor having a first breakdown voltage equal to the second voltage threshold, the second smoothing capacitor being connected in parallel to the first smoothing capacitor and having a second breakdown voltage higher than a first voltage threshold, the first voltage threshold being a value higher than or equal to the second voltage threshold.

* * * * *